(12) United States Patent
Savov et al.

(10) Patent No.: US 10,999,150 B2
(45) Date of Patent: May 4, 2021

(54) METHODS, SYSTEMS AND APPARATUS FOR DYNAMICALLY EXTENDING A CLOUD MANAGEMENT SYSTEM BY ADDING ENDPOINT ADAPTER TYPES

(71) Applicant: VMware, Inc., Palo Alto, CA (US)

(72) Inventors: Boris Savov, Sofia (BG); George P. Dimitrov, Sofia (BG); Ventsyslav Raikov, Sofia (BG); Rosen Spasov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 67 days.

(21) Appl. No.: 16/047,278

(22) Filed: Jul. 27, 2018

(65) Prior Publication Data

US 2020/0036594 A1    Jan. 30, 2020

(51) Int. Cl.
| | |
|---|---|
| *H04L 12/24* | (2006.01) |
| *G06F 9/455* | (2018.01) |
| *G06F 9/50* | (2006.01) |
| *H04L 29/08* | (2006.01) |

(52) U.S. Cl.
CPC .......... *H04L 41/12* (2013.01); *G06F 9/45558* (2013.01); *G06F 9/5077* (2013.01); *H04L 29/08135* (2013.01); *H04L 41/0813* (2013.01); *H04L 67/10* (2013.01); *G06F 9/4555* (2013.01); *G06F 2009/45562* (2013.01); *G06F 2009/45595* (2013.01)

(58) Field of Classification Search
CPC ..... H04L 29/08135; H04L 41/08–0813; H04L 41/0823–0836; H04L 41/0889–0893; H04L 41/22; H04L 67/10; H04L 67/40; G06F 9/45533–45558; G06F 9/5077; G06F 2009/45595–45595

See application file for complete search history.

(56) References Cited

U.S. PATENT DOCUMENTS

| | | | |
|---|---|---|---|
| 9,456,011 B1 * | 9/2016 | Nick | H04L 67/125 |
| 9,483,312 B2 * | 11/2016 | Bailey | H04L 67/42 |
| 10,289,445 B1 * | 5/2019 | Swanson | G06F 11/3006 |
| 10,608,892 B2 * | 3/2020 | Savov | H04L 67/2804 |
| 2010/0042720 A1 * | 2/2010 | Stienhans | G06F 9/5072 709/226 |
| 2012/0042040 A1 * | 2/2012 | Bailey | G06F 9/5055 709/217 |

(Continued)

*Primary Examiner* — Brendan Y Higa
(74) *Attorney, Agent, or Firm* — Hanley, Flight and Zimmerman, LLC

(57) ABSTRACT

Methods, apparatus and articles of manufacture for dynamically extending a cloud management system by adding endpoint adapter types are disclosed. An example cloud management system includes: an interface to communicate with an external device; a host to manage requests and allocate resources through one or more virtual machines; and an endpoint registry to include an endpoint adapter and metadata defining the endpoint adapter, the endpoint adapter to specify communication between at least one of the host or the external device and an endpoint. In the example cloud management system, the host is to at least enable, via the interface, the external device to access the endpoint registry a) to register an endpoint adapter configuration with the endpoint registry and b) to retrieve the endpoint adapter configuration from the endpoint registry.

20 Claims, 14 Drawing Sheets

(56) References Cited

U.S. PATENT DOCUMENTS

| | | | | |
|---|---|---|---|---|
| 2014/0122670 A1* | 5/2014 | Levy | ................... | H04L 41/0893 |
| | | | | 709/220 |
| 2015/0074670 A1* | 3/2015 | Gerganov | ............. | G06F 9/5027 |
| | | | | 718/103 |
| 2015/0154041 A1* | 6/2015 | Provis | ................ | H04L 29/0809 |
| | | | | 718/1 |
| 2015/0180734 A1* | 6/2015 | Maes | .................... | G06F 9/5072 |
| | | | | 709/226 |
| 2016/0021197 A1* | 1/2016 | Pogrebinsky | ............. | G06F 8/61 |
| | | | | 709/226 |
| 2016/0048400 A1* | 2/2016 | Yang | ........................ | H04L 67/34 |
| | | | | 718/1 |
| 2016/0241446 A1* | 8/2016 | Gupte | ..................... | H04L 41/20 |
| 2016/0246592 A1* | 8/2016 | Jamjoom | .................. | G06F 8/70 |
| 2017/0142157 A1* | 5/2017 | Cao | ......................... | H04L 63/20 |
| 2018/0131514 A1* | 5/2018 | Jones | ...................... | H04L 9/14 |
| 2019/0052643 A1* | 2/2019 | Doshi | ...................... | H04L 63/08 |

* cited by examiner

METHODS, SYSTEMS AND APPARATUS FOR DYNAMICALLY EXTENDING A CLOUD MANAGEMENT SYSTEM BY ADDING ENDPOINT ADAPTER TYPES

FIELD OF THE DISCLOSURE

The present disclosure relates generally to computing system virtualization, and, more particularly, to methods and apparatus for dynamically extending a cloud management system by adding endpoint adapter types.

BACKGROUND

Virtualizing computer systems provides benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

IaaS can be provided separate from and/or in conjunction with "software-as-a-service" (SaaS) which provides centrally-hosted software (e.g., hosted on an IaaS, etc.) to users on a subscription basis, such as using a thin client via a web browser, etc.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Figure 1:
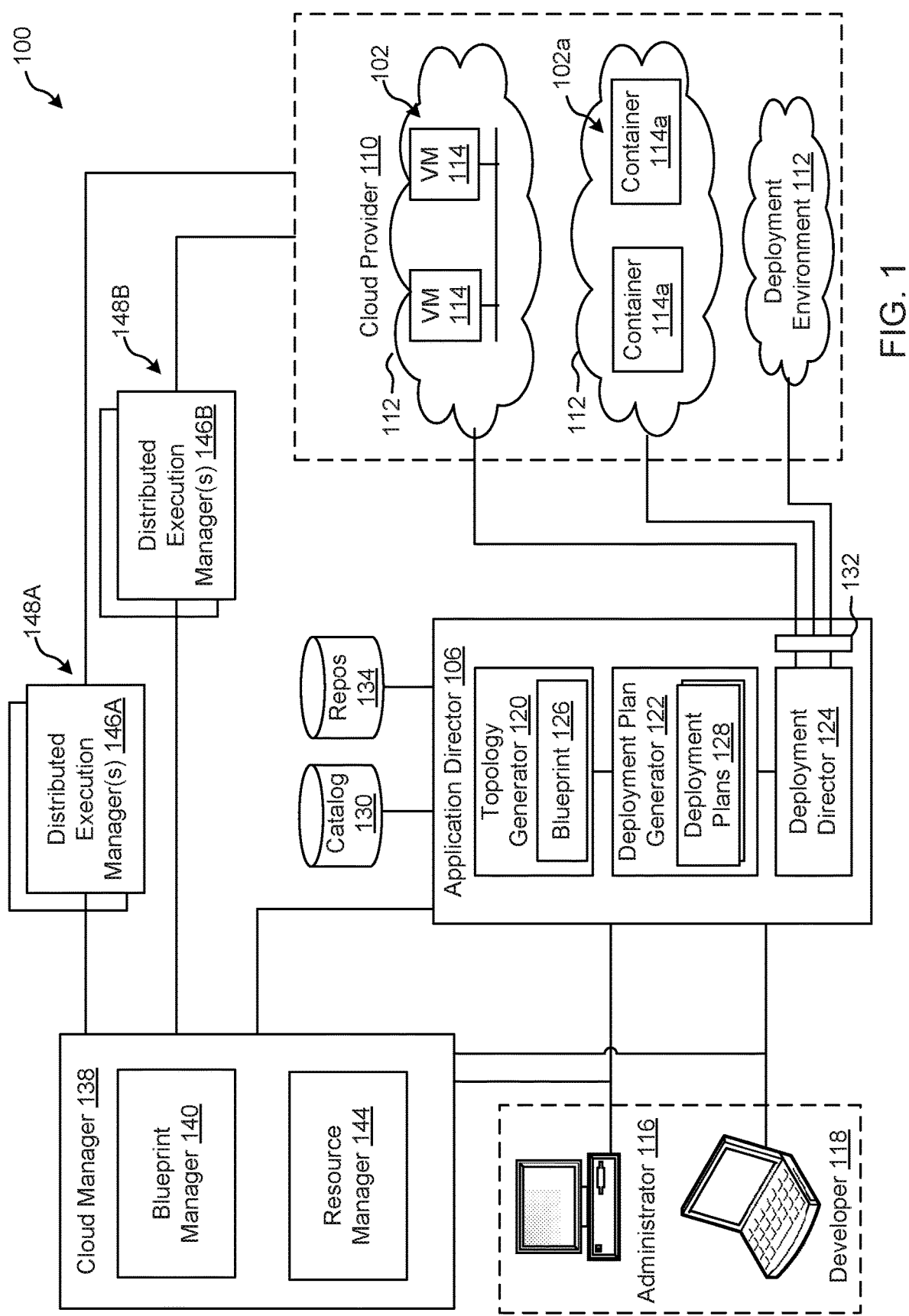
FIG. 1 depicts an example system constructed in accordance with the teachings of this disclosure for managing a cloud computing platform.

Virtualization technologies can be used for computing, storage, and/or networking, for example. Using virtualization, hardware computing resources and/or other physical resources can be replicated in software. One or more application programming interfaces (APIs) can be implemented to provide access to virtualized resources for users, applications, and/or systems while limiting or masking underlying software and/or hardware structure.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, which is hereby incorporated herein by reference in its entirety.

Cloud computing platforms may provide many powerful capabilities for performing computing operations. However, taking advantage of these computing capabilities manually may be complex and/or require significant training and/or expertise. Prior techniques to provide cloud computing platforms and services often require customers to understand details and configurations of hardware and software resources to establish and configure the cloud computing platform. Methods and apparatus disclosed herein facilitate the management of virtual machine resources in cloud computing platforms.

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

In certain examples, a VM can host a container and/or a container can be implemented for virtualization in place of the VM. Containers (e.g., Docker®, Rocket™, Linux® containers (LXC), etc.) can be used in computing environments to run applications, programs, utilities, and/or any other software in isolation. Containers can be used to achieve improved resource management (e.g., resources used by containerized components are isolated for use only by those components that are part of the same container)

and/or for security purposes (e.g., restricting access to containerized files or components). In addition, containers can also be used to achieve lightweight, reproducible application deployment. While a container is intended to run as a well-isolated instance of software in a host environment, the security properties of a container image and/or a container can impact operations of other resources and/or processes in a host computer environment in which the container executes.

Prior to running as a container in the host environment, the container is defined in a container image that specifies components such as an application along with any libraries, binaries and/or other files to execute the container in the host environment (e.g., a VM, etc.). In some examples, the specified components remain unassembled (e.g., they are not located together to form a container) until a time at which the container is to be executed. When a determination is made to execute the container in the host environment, the host environment uses the container image to assemble the previously unassembled parts specified in the container image for execution as a container. In certain examples, a platform as a service (PaaS) environment can host a plurality of containers and virtual applications (vApps).

As disclosed herein, methods and apparatus provide for automation of management tasks such as provisioning multiple virtual machines and/or containers for IaaS, SaaS, and/or other product installation. Virtual appliances (e.g., a pre-configured virtual machine image ready to run on a hypervisor, etc.), component servers (e.g., Microsoft Windows™ machines, etc.), etc., can be distributed, installed, and managed using virtualization of computing resources including operating system virtualization.

For example, operating system virtualization (also referred to as container virtualization) can facilitate deployment and management of virtual computing resources to provision virtual machines, containers, associated appliances and/or machines, allocate tasks to desired systems to execute those virtual machines or tasks, and/or reclaim cloud computing resources that are no longer in use. The improvements to cloud, cloud-like, and/or other virtual computer/network management systems (e.g., the vCloud Automation Center (vCAC) from VMware®, the vRealize Automation (vRA) Cloud Automation Software from VMware®, VMware NSX® for the Software-Defined Data Center (SDDC), VMware ESXi® enterprise hypervisor, etc.), interfaces, portals, etc., disclosed herein may be utilized individually and/or in any combination. For example, all or a subset of the described improvements may be utilized.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

In certain examples, when starting up a cloud computing environment or adding resources to an already established cloud computing environment, data center operators struggle to offer cost-effective services while making resources of the infrastructure (e.g., storage hardware, computing hardware, and networking hardware) work together to achieve pain-free installation/operation and optimizing the resources for improved performance. Prior techniques for establishing and maintaining data centers to provide cloud and/or cloud-like computing services often require customers to understand details and configurations of hardware resources to establish workload domains in which to execute customer services. In certain examples, workload domains are mapped to a management cluster deployment (e.g., a vSphere cluster of VMware, Inc.) in a single rack deployment in a manner that is relatively easier to understand and operate by users than prior techniques. Thus, as additional racks are added to a system, cross-rack clusters become an option. This enables creating more complex configurations for workload domains as there are more options for deployment as well as additional management cluster capabilities that can be leveraged. Examples disclosed herein facilitate making workload domain configuration and management easier than prior techniques.

A management cluster is a group of physical machines and virtual machines (VM) that host core cloud infrastructure components necessary for managing a software defined data center (SDDC) in a cloud computing environment that supports customer services. Cloud computing allows ubiquitous, convenient, on-demand network access to a shared pool of configurable computing resources. A cloud computing customer can request allocations of such resources to support services required by those customers. For example, when a customer requests to run one or more services in the cloud computing environment, one or more workload domains may be created based on resources in the shared pool of configurable computing resources.

Virtual networks can be used with virtual machines in SDDC and/or other cloud or cloud-like computing environments. Virtual networks can be managed (e.g., using NSX sold by VMware, Inc.) using policies and rules. Network and other infrastructure is configured for consumption by applications. Virtual network(s) are provisioned for such applications to be deployed in the SDDC.

Certain examples provide multi-cloud management systems that manage a combination of public and private clouds (e.g., a hybrid cloud environment) running a variety of computing processes from traditional processes to virtual machines to container (e.g., cloud native) workloads. Automation and pre-defined policies providing high levels of agility and flexibility for developers and lines of business while maintaining governance and control.

An example multi-cloud management system can provision infrastructure and application resources with a choice of consumption (e.g., application programming interface (API), Catalog, command line interface (CLI), etc.) based on pre-defined policies and permissions. Provisioning and maintenance of resources are automated through creation of blueprints (e.g., models) that include components of requested services along with their relationships, including a mix of VM and container-based services. Integration can be extended to third party and/or customer applications, tools, etc.

In a virtual infrastructure, such as a multi-cloud management system, an endpoint is a provisioned resource completing a provisioning process such as a public cloud resource (e.g., a web service such as Amazon Web Services (AWS), etc.), a virtual appliance (e.g., an external orchestrator appliance, etc.), a private cloud (e.g., hosted by VMware vSphere™, Microsoft Hyper-V™, etc.), etc. For example, a service has an endpoint that provides a specific function or feature of that service. The service may have multiple endpoints. For example, a catalog service provides catalog features via an endpoint for a shell/user interface application service to consume. Endpoints can include physical endpoints, virtual endpoints, Internet Protocol Address Management (IPAM) endpoints, etc. An endpoint type defines a set of one or more methods/functions that can be invoked, and an endpoint or endpoint instance is the object that implements or provides access to the methods/functions. An endpoint adapter enables the endpoint and the management system to communicate with each other. The endpoint adapter can facilitate/enable data/instruction communication, security, access control, redundancy, auditing, etc. If properly registered, an infrastructure-driven workflow can be launched for the endpoint via the endpoint adapter, for example.

However, in multi-cloud management systems, it is hard or even impossible to extend a virtual platform and/or other solution to manage a new kind of endpoint adapter that is not originally defined as part of the platform. For example, by default, the virtual platform has support to manage only the three major public clouds: AWS, Microsoft Azure, and Google Compute Platform (GCP). Traditionally, to extend the virtual platform with new kind of endpoint requires changing the platform code base (e.g., to support the new endpoint type) and restarting the virtual platform.

Example Virtualization Environments

Many different types of virtualization environments exist. Three example types of virtualization environment are: full virtualization, paravirtualization, and operating system virtualization.

Full virtualization, as used herein, is a virtualization environment in which hardware resources are managed by a hypervisor (e.g., a virtual machine monitor or computer software, hardware and/or firmware that creates and runs virtual machines) to provide virtual hardware resources to a virtual machine. In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated the process from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

Example Provisioning and Subscription Systems and Methods

Certain examples enable client definition and deployment of architecturally complex virtual computing environments. Such virtual computing environments can include multiple machines, software, etc. While some systems (e.g., vRealize Automation®, etc.) provide functionality to enable common scenarios "out of the box", certain examples enable customization for specific functionality. Certain examples provide a flexible and powerful extensibility mechanism that enables cloud administrators and/or other users, for example, to fine tune a resource provisioning process by blocking, pausing, and/or otherwise (temporarily) halting the provisioning process to enable execution of custom scripts and/or functionality before provisioning continues. In certain examples, the provisioning process can fail if a specified criterion is not met.

In certain examples, an event broker service (EBS) provides publish-subscribe functionality to allow other services to subscribe to messages regarding system process events (e.g., provisioning, etc.) and receive updates regarding process execution. For example, the EBS uses REST (Representational State Transfer) APIs (Application Programming Interface) and/or other client-server communication protocol for publish-subscribe communication. The event broker REST API provides features for managing subscriptions, event topics, events, and messages, for example.

In certain examples, the EBS allows services to register and manage event topics, publish events, and manage subscriptions by event consumers. Event consumers can register/subscribe to retrieve and/or otherwise receive events according to event topic, etc. Event producers (e.g., services, service providers, etc.) publish events to the EBS, and, after receiving an event, the EBS notifies event consumers that are subscribed to the event.

A blueprint is a specification for a service (e.g., a virtual computing service, etc.). A blueprint specifies components of a service, such as input parameters, submission and read-only forms, sequence of actions, provisioning, etc. Service blueprints can be created to provision custom resources that have previously been created according to certain parameters, for example. The blueprint stores the parameters in association with the resource to enable the resource to be instantiated again. A blueprint, such as a service blueprint, can be published as a catalog item for selection via a catalog of available services for provisioning, for example. When a catalog item is selected, the corresponding resource is provisioned according to the parameters specified in the blueprint, for example.

Certain examples provide a composition blueprint service (CBP) that enables customers (e.g., via a designer) to define their complex multi-machine systems including dependencies between components and software to install on each component. An event broker service (EBS) works with the CBP and provides publish-subscribe functionality for provisioning and/or other system process, in which blocking subscribers are able to process events first, before non-blocking subscribers. By integrating CBP and EBS, clients can extend, modify, and/or otherwise alter flow of a provisioning process. The CBP can construct a dependency tree for virtual computing system components and provision the components in order (or in parallel if no dependency exists between components) as each component transitions among a plurality of lifecycle states including allocation, provisioning, software installation, deallocation, continuing operations, etc. For each lifecycle state, a subscription topic can be defined in the EBS, which enables customers and/or other services to subscribe and listen for events related to the subscribed topic.

In certain examples, when the CBP initializes (e.g., is selected via catalog, started by a service, instantiated in a VM, etc.), the CBP subscribes (e.g., listens, monitors, etc.) to subscription topics corresponding to lifecycle states as a non-blocking subscriber. As a non-blocking subscriber, client processes can accommodate events with priority over the CBP as a non-blocking subscriber, for example.

During provisioning of resource(s) corresponding to a selected blueprint, the CBP sends an event to EBS at each lifecycle stage. A payload of the event includes relevant information about current operation, deployment parameters, status, etc.

FIG. 1 depicts an example system 100 constructed in accordance with the teachings of this disclosure for managing a cloud computing platform. The example system 100 includes an application director 106 and a cloud manager 138 to manage a cloud computing platform provider 110 as described in more detail below. As described herein, the example system 100 facilitates management of the cloud provider 110 and does not include the cloud provider 110. Alternatively, the system 100 could be included in the cloud provider 110.

The cloud computing platform provider 110 provisions virtual computing resources (e.g., virtual machines, or "VMs," 114) that may be accessed by users of the cloud computing platform 110 (e.g., users associated with an administrator 116 and/or a developer 118) and/or other programs, software, device. etc.

An example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging, and/or production of applications. The administrator 116, the developer 118, other programs, and/or other devices may access services from the cloud computing platform provider 110, for example, via REST (Representational State Transfer) APIs (Application Programming Interface) and/or via any other client-server communication protocol. Example implementations of a REST API for cloud computing services include a vCloud Administrator Center™ (vCAC) and/or vRealize Automation™ (vRA) API and a vCloud Director™ API available from VMware, Inc. The example cloud computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112 of FIG. 1 is vCloud DataCenter cloud computing services available from VMware, Inc.

In some examples disclosed herein, a lighter-weight virtualization is employed by using containers in place of the VMs 114 in the development environment 112. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Also like virtual machines, the containers 114a can execute instances of applications or programs (e.g., an example application 102a) separate from application/program instances executed by the other containers in the same development environment 112.

The example application director 106 of FIG. 1, which may be running in one or more VMs, orchestrates deployment of multi-tier applications onto one of the example deployment environments 112. As illustrated in FIG. 1, the example application director 106 includes a topology generator 120, a deployment plan generator 122, and a deployment director 124.

The example topology generator 120 generates a basic blueprint 126 that specifies a logical topology of an application to be deployed. The example basic blueprint 126 generally captures the structure of an application as a collection of application components executing on virtual computing resources. For example, the basic blueprint 126 generated by the example topology generator 120 for an online store application may specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including one or more application packages and their dependent middleware and/or operating systems. Applications may be distributed across multiple VMs. Thus, in the example described above, the term "application" refers to the entire online store application, including application server and database components, rather than just the web application itself. In some instances, the application may include the underlying hardware and/or virtual computing hardware utilized to implement the components.

The example basic blueprint 126 of FIG. 1 may be assembled from items (e.g., templates) from a catalog 130, which is a listing of available virtual computing resources (e.g., VMs, networking, storage, etc.) that may be provisioned from the cloud computing platform provider 110 and available application components (e.g., software services, scripts, code components, application-specific packages) that may be installed on the provisioned virtual computing resources. The example catalog 130 may be pre-populated and/or customized by an administrator 116 (e.g., IT (Information Technology) or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the example application director 106 of FIG. 1 generates a deployment plan 128 based on the basic blueprint 126 that includes deployment settings for the basic blueprint 126 (e.g., virtual computing resources' cluster size, CPU, memory, networks, etc.) and an execution plan of tasks having a specified order in which virtual computing resources are provisioned and application components are installed, configured, and started. The example deployment plan 128 of FIG. 1 provides an IT administrator with a process-oriented view of the basic blueprint 126 that indicates discrete actions to be performed to deploy the application. Different deployment plans 128 may be generated from a single basic blueprint 126 to test prototypes (e.g., new application versions), to scale up and/or scale down deployments, and/or to deploy the application to different deployment environments 112 (e.g., testing, staging, production). The deployment plan 128 is separated and distributed as local deployment plans having a series of tasks to be executed by the VMs 114 provisioned from the deployment environment 112. Each VM 114 coordinates execution of each task with a centralized deployment module (e.g., the deployment director 124) to ensure that tasks are executed in an order that complies with dependencies specified in the application blueprint 126.

The example deployment director 124 of FIG. 1 executes the deployment plan 128 by communicating with the cloud computing platform provider 110 via a cloud interface 132 to provision and configure the VMs 114 in the deployment environment 112. The example cloud interface 132 of FIG. 1 provides a communication abstraction layer by which the application director 106 may communicate with a heterogeneous mixture of cloud provider 110 and deployment environments 112. The deployment director 124 provides each VM 114 with a series of tasks specific to the receiving VM 114 (herein referred to as a "local deployment plan"). Tasks are executed by the VMs 114 to install, configure, and/or start one or more application components. For example, a task may be a script that, when executed by a VM 114, causes the VM 114 to retrieve and install particular software packages from a central package repository 134. The example deployment director 124 coordinates with the VMs 114 to execute the tasks in an order that observes installation dependencies between VMs 114 according to the deployment plan 128. After the application has been deployed, the application director 106 may be utilized to monitor and/or modify (e.g., scale) the deployment.

The example cloud manager 138 of FIG. 1 interacts with the components of the system 100 (e.g., the application director 106 and the cloud provider 110) to facilitate the management of the resources of the cloud provider 110. The example cloud manager 138 includes a blueprint manager 140 to facilitate the creation and management of multi-machine blueprints and a resource manager 144 to reclaim unused cloud resources. The cloud manager 138 may additionally include other components for managing a cloud environment.

The example blueprint manager 140 of the illustrated example manages the creation of multi-machine blueprints that define the attributes of multiple virtual machines as a single group that can be provisioned, deployed, managed, etc. as a single unit. For example, a multi-machine blueprint may include definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine and/or container). Accordingly, the blueprint manager 140 facilitates more efficient management of multiple virtual machines and/or containers than manually managing (e.g., deploying) basic blueprints individually. Example management of multi-machine blueprints is described in further detail in conjunction with FIG. 2.

The example blueprint manager 140 of FIG. 1 additionally annotates basic blueprints and/or multi-machine blueprints to control how workflows associated with the basic blueprints and/or multi-machine blueprints are executed. As used herein, a workflow is a series of actions and decisions to be executed in a virtual computing platform. The example system 100 includes first and second distributed execution manager(s) (DEM(s)) 146A and 146B to execute workflows. According to the illustrated example, the first DEM 146A includes a first set of characteristics and is physically located at a first location 148A. The second DEM 146B includes a second set of characteristics and is physically located at a second location 1489. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, the example blueprint manager 140 annotates basic blueprints and/or multi-machine blueprints with capabilities that can be performed by a DEM that is labeled with the same or similar capabilities.

The resource manager 144 of the illustrated example facilitates recovery of cloud computing resources of the cloud provider 110 that are no longer being activity utilized. Automated reclamation may include identification, verification and/or reclamation of unused, underutilized, etc. resources to improve the efficiency of the running cloud infrastructure.

Figure 2:
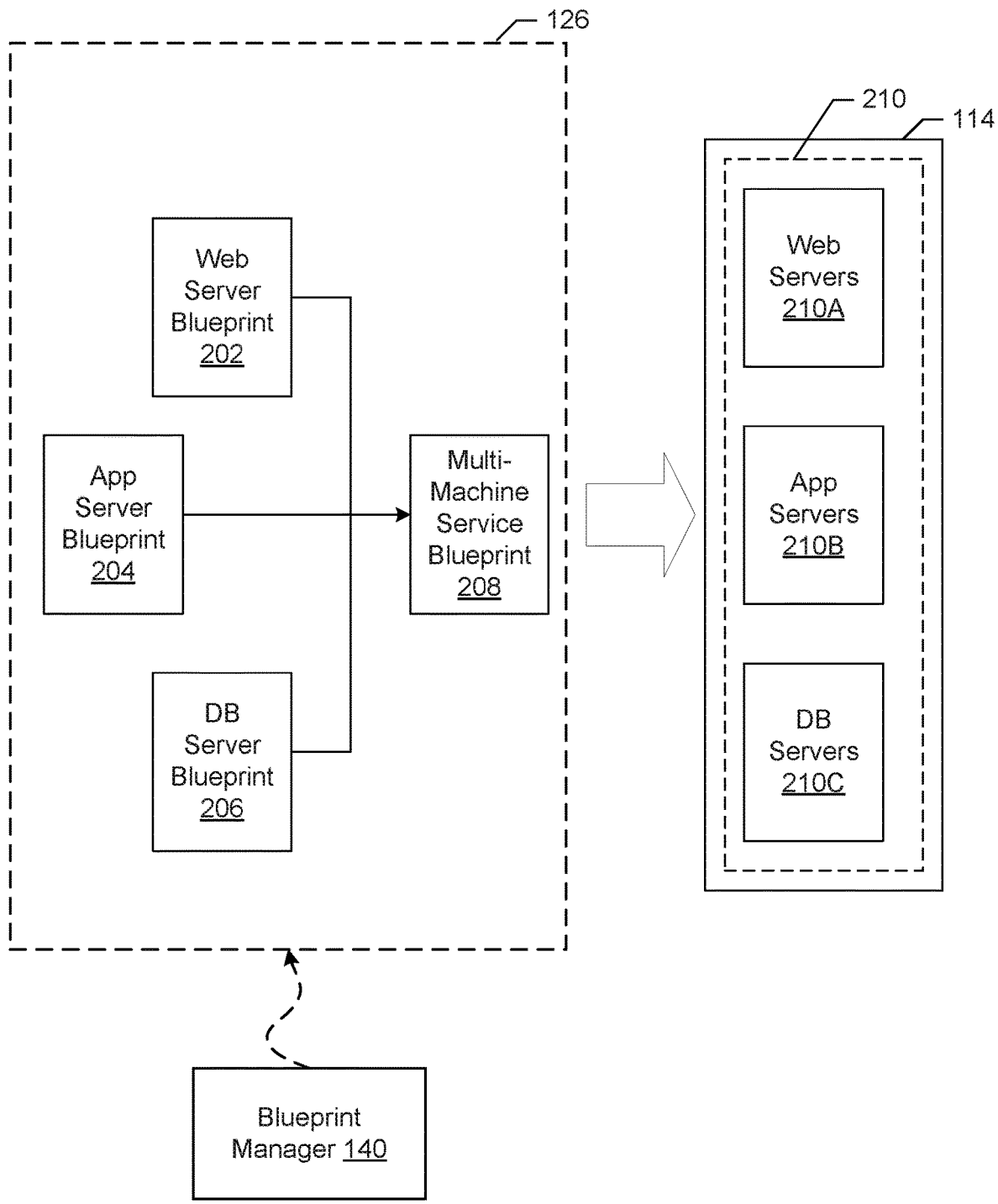
FIG. 2 illustrates an example generation of a multi-machine blueprint by the example blueprint manager of FIG. 1.

FIG. 2 illustrates an example implementation of the blueprint 126 as a multi-machine blueprint generated by the example blueprint manager 140 of FIG. 1. In the illustrated example of FIG. 2, three example basic blueprints (a web server blueprint 202, an application server blueprint 204, and a database (DB) server blueprint 206) have been created (e.g., by the topology generator 120). For example, the web server blueprint 202, the application server blueprint 204, and the database server blueprint 206 may define the components of an e-commerce online store.

The example blueprint manager 140 provides a user interface for a user of the blueprint manager 140 (e.g., the administrator 116, the developer 118, etc.) to specify blueprints (e.g., basic blueprints and/or multi-machine blueprints) to be assigned to an instance of a multi-machine blueprint 208. For example, the user interface may include a list of previously generated basic blueprints (e.g., the web server blueprint 202, the application server blueprint 204, the database server blueprint 206, etc.) to allow selection of desired blueprints. The blueprint manager 140 combines the selected blueprints into the definition of the multi-machine blueprint 208 and stores information about the blueprints in a multi-machine blueprint record defining the multi-machine blueprint 208. The blueprint manager 140 may additionally include a user interface to specify other characteristics corresponding to the multi-machine blueprint 208. For example, a creator of the multi-machine blueprint 208 may specify a minimum number and a maximum number of each blueprint component of the multi-machine blueprint 208 that may be provisioned during provisioning of the multi-machine blueprint 208.

Accordingly, any number of virtual machines (e.g., the virtual machines associated with the blueprints in the multi-machine blueprint 208) and/or containers may be managed collectively. For example, the multiple virtual machines corresponding to the multi-machine blueprint 208 may be provisioned based on an instruction to provision the multi-machine blueprint 208, may be power cycled by an instruction, may be shut down by an instruction, may be booted by an instruction, etc. As illustrated in FIG. 2, an instruction to provision the multi-machine blueprint 208 may result in the provisioning of a multi-machine service 210 formed from one or more VMs 114 that includes virtualized web server(s) 210A, virtualized application server(s) 210B, and virtualized database server(s) 210C. The number of virtual machines and/or containers provisioned for each blueprint may be specified during the provisioning of the multi-machine blueprint 208 (e.g., subject to the limits specified during creation or management of the multi-machine blueprint 208).

The multi-machine blueprint 208 maintains the reference to the basic blueprints 202, 204, 206. Accordingly, changes made to the blueprints (e.g., by a manager of the blueprints different than the manager of the multi-machine blueprint 208) may be incorporated into future provisioning of the multi-machine blueprint 208. Accordingly, an administrator maintaining the source blueprints (e.g., an administrator charged with managing the web server blueprint 202) may change or update the source blueprint and the changes may be automatically propagated to the machines provisioned from the multi-machine blueprint 208. For example, if an operating system update is applied to a disk image referenced by the web server blueprint 202 (e.g., a disk image embodying the primary disk of the web server blueprint 202), the updated disk image is utilized when deploying the multi-machine blueprint. Additionally, the blueprints may specify that the machines 210A, 210B, 2100 of the multi-machine service 210 provisioned from the multi-machine blueprint 208 operate in different environments. For example, some components may be physical machines, some may be on-premises virtual machines, and some may be virtual machines at a cloud service.

Several multi-machine blueprints 208 may be generated to provide one or more varied or customized services. For example, if virtual machines deployed in the various States of the United States require different settings, a multi-machine blueprint 208 could be generated for each state. The multi-machine blueprints could reference the same build profile and/or disk image, but may include different settings specific to each state. For example, the deployment workflow may include an operation to set a locality setting of an operating system to identify a particular state in which a resource is physically located. Thus, a single disk image may be utilized for multiple multi-machine blueprints 208 reducing the amount of storage space for storing disk images compared with storing a disk image for each customized setting.

Figure 3:
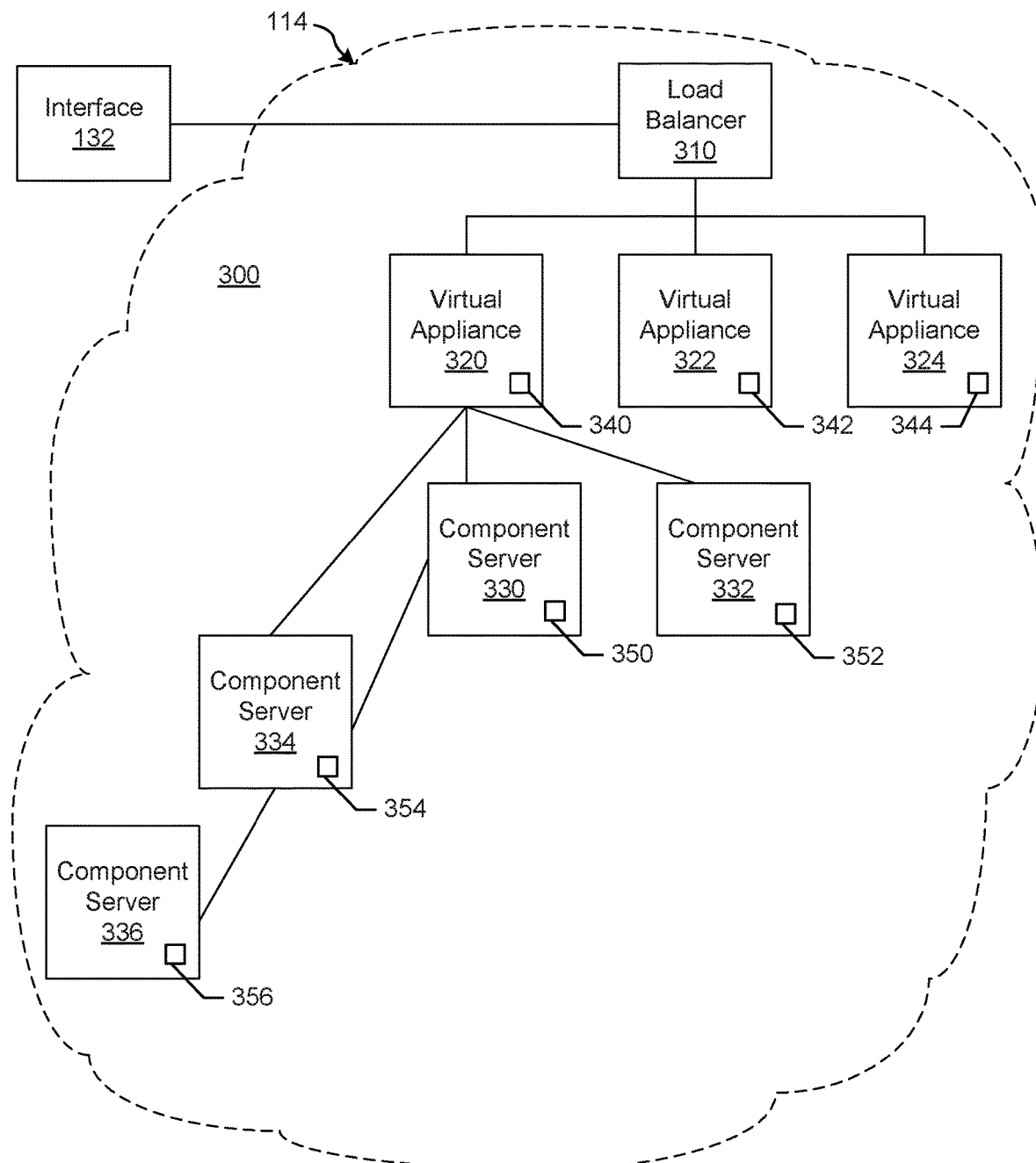
FIG. 3 illustrates an example installation of deployed virtual machines and associated servers acting as hosts for deployment of component servers for a customer.

FIG. 3 illustrates an example installation of deployed appliances or virtual appliances (vAs) (e.g., VMs 114 and/or containers 114a) and associated virtualized servers acting as hosts for deployment of component servers (e.g., Web server, application server, database server, etc.) for a customer. The vAs can be deployed as an automation tool, for example, used to deliver VMs and associated applications for on-premises automation and/or handling of external cloud resources (e.g., Microsoft Azure™, Amazon Web Services™, etc.).

As shown in the example of FIG. 3, an installation 300 includes a load balancer (LB) 310 to assign tasks and/or manage access among a plurality of vAs 320, 322, 324. Each vA 320-324 is a deployed VM 114 and/or container 114a. In this example, the vA 320 communicates with a plurality of component or host servers 330, 332, 334, 336 which store components for execution by users (e.g., Web server 210A with Web components, App server 210B with application components, DB server 210C with database components, etc.). As shown in the example of FIG. 3, component servers 334, 336 can stem from component server 330 rather than (or in addition to) directly from the virtual appliance 320, although the vA 320 can still communicate with such servers 334, 336. The LB 310 enables the multiple vAs 320-324 and multiple servers 330-336 to appear as one device to a user. Access to functionality can then be distributed among appliances 320-324 by the LB 310 and among servers 330-336 by the respective appliance 320, for example. The LB 310 can use least response time, round-robin, and/or other method to balance traffic to vAs 320-324 and servers 330-336, for example.

In the example installation 300, each vA 320, 322, 324 includes a management endpoint 340, 342, 344. Each component server 330, 332, 334, 336 includes a management agent 350, 352, 354, 356. The management agents 350-356 can communicate with their respective endpoint 340 to facilitate transfer of data, execution of tasks, etc., for example.

In certain examples, the management agents 350-356 synchronize component servers 330-336 with the vA 320-234 and facilitate host access and associated services (e.g., hostd, ntpd, sfcbd, slpd, wsman, vobd, etc.). The management agents 350-356 can communicate with their respective endpoint 340 to facilitate transfer of data, execution of tasks, etc., for example. The relationship between management endpoint 340, 342, 344 and associated management agents 350, 352, 354, 356 can be used to deploy and install software on multiple component machines 330, 332, 334, 336.

In certain examples, a graphical user interface associated with a front end of the load balancer 310 guides a customer through one or more questions to determine system requirements for the installation 300. Once the customer has completed the questionnaire and provided firewall access to install the agents 350-356, the agents 350-356 communicate with the endpoint 340 without customer involvement. Thus, for example, if a new employee needs a Microsoft Windows® machine, a manager selects an option (e.g., clicks a button, etc.) via the graphical user interface to install a VM 114 and/or container 114a that is managed through the installation 300. To the user, he or she is working on a single machine, but behind the scenes, the virtual appliance (vA) 320 is accessing different servers 330-336 depending upon what functionality is to be executed.

In certain examples, agents 350-356 are deployed in a same data center as the endpoint 340 to which the agents 350-356 are associated. The deployment can include a plurality of agent servers 330-336 distributed worldwide, and the deployment can be scalable to accommodate additional server(s) with agent(s) to increase throughput and concurrency, for example.

Figure 4:
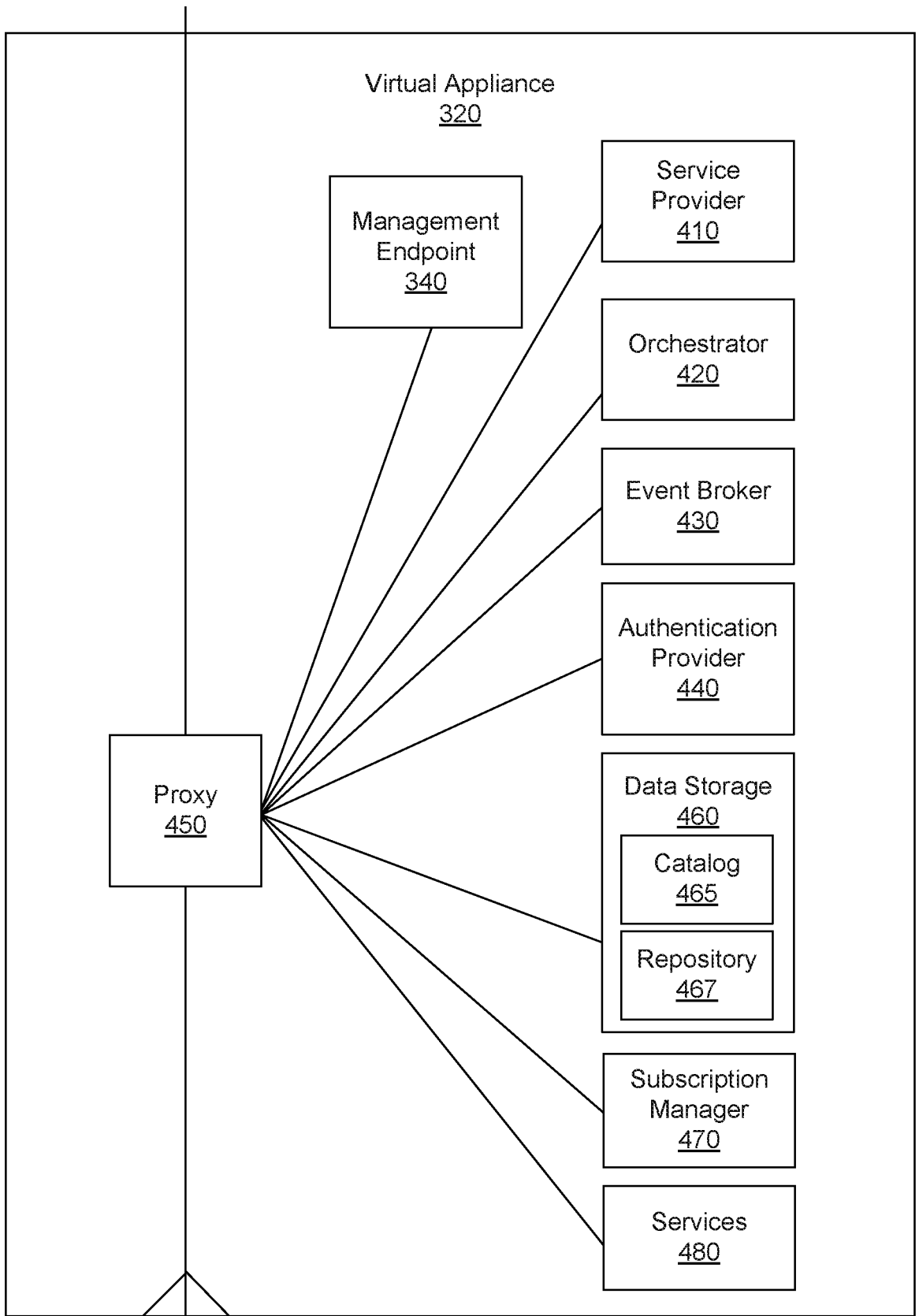
FIG. 4 illustrates an example implementation of a virtual appliance including subscription and provisioning functionality in accordance with the present disclosure.

FIG. 4 illustrates an example implementation of the vA 320. In the example of FIG. 4, the vA 320 includes an example service provisioner 410, an example orchestrator 420, an example event broker 430, an example authentication provider 440, an example internal reverse proxy 450, an example data storage 460, an example catalog 465, an example repository 467, an example subscription manager 470, and example services 480. The components 410, 420, 430, 440, 450, 460, 470, 480 of the vA 320 can be implemented by one or more of the VMs 114 and/or containers 114a, for example. The example service provisioner 410 provides services to provision interfaces (e.g., Web interface, application interface, etc.) for the vA 320. The example orchestrator (e.g., vCO) 420 is an embedded or internal orchestrator that can leverage a provisioning manager, such as the application director 106 and/or cloud manager 138, to provision services but is embedded in the vA 320. For example, the orchestrator 420 can be used to invoke a blueprint to provision a manager for services. In some examples, the orchestrator 420 includes a library of workflows that can be selected for execution.

Example services 480 can include catalog services, identity services, component registry services, approval services, resource management services, event broker services, IaaS, XaaS ("Anything-as-a-Service"), etc. Catalog services provide a user interface via which a user can request provisioning of different preset environments (e.g., a VM 114 including an operating system and software and some customization, etc.), for example. Identity services facilitate authentication and authorization of users and assigned roles, for example. The component registry maintains information corresponding to installed and deployed services (e.g., uniform resource locators for services installed in a VM/vA, etc.), for example. The approval services provide a method by which a request to provision a virtual machine (or service) can be approved by a system administrator(s). The resource management services can control the leasing, expiration and reclamation of managed resources. The event broker 430 provides a messaging broker for event-based communication, for example. The IaaS provisions one or more VMs and/or containers for a customer via the vA 320. The XaaS can extend the provisioning to also request, approve, provision, operate, and decommission any type of catalog items (e.g., storage, applications, accounts, and anything else that the catalog provides as a service).

The example event broker 430 provides a mechanism to handle tasks which are transferred between the services 190 and the orchestrator 420. The example authentication provider 440 (e.g., VMware Horizon™ services, etc.) authenticates access to services and data, for example.

The components of the vA 320 access each other through REST API calls behind the internal reverse proxy 450 (e.g., a high availability (HA) proxy HAProxy) which provides a high availability load balancer and proxy for Transmission Control Protocol (TCP)- and Hypertext Transfer Protocol (HTTP)-based application requests. In this example, the proxy 450 forwards communication traffic from within the vA 320 and/or between vAs 320, 322, 324 of FIG. 3 to the appropriate component(s) of the vA 320. In certain examples, services access the local host/proxy 450 on a particular port, and the call is masked by the proxy 450 and forwarded to the particular component of the vA 320. Since the call is masked by the proxy 450, components can be adjusted within the vA 320 without impacting outside users.

In the example vA 320 of FIG. 4, the example services 480, the example event broker 430, the example subscription manager 470, and the example orchestrator 420 implement an example workflow subscription service to enable services and/or other clients to subscribe to provisioning workflow events. Using the subscription service, provisioning workflows can be extended to include additional tasks. The example workflow subscription service implemented by the vA 320 enables a customer, such as the tenant administrator 116, or any other authorized user, service, machine, etc., to control when provisioning workflows (or workflow related to provisioning activities) are performed based on events reported by service(s) 480 to the event broker 430. In some examples, the workflow subscription service further allows the tenant administrator 116 and/or other client to control when workflows are performed based on events coupled with user-specified and/or other process-specified conditions.

As used herein, an event topic describes a set of events having a same logical intent and a same structure. Each event is an instance of an event topic. Further an event topic is a type of event message that is sent to the event broker 430 by one or more of the services 480. An event can indicate a change in the state of one of the services 480 that produces the event (or any of the entities managed by any such one of the services 480), for example. An event is an informational element (or data structure) in which information about an event occurrence is recorded. An event notification or message transports information about the event between the various services 480 and the event broker 430 and between the event broker 430 and the subscription manager 470.

In some examples, event topics include a post approval event topic, a pre-approval event topic, an event log default event topic, a blueprint configuration event topic, a resource reclamation event topic, a business group configuration event topic, an orchestration server configuration event topic, a machine lifecycle event topic, a machine provisioning event topic, etc. The post approval and pre-approval event topics are associated with the approval service and can be used to trigger workflows associated with obtaining enterprise approvals for an operation. (For example, if a user would like to provision a new virtual machine, the pre-approval event topic may be used to generate a workflow that will require a set of administrative approvals be obtained before the virtual machine is provisioned.) The event log default event topic represents the addition of an entry in an event log and can be generated by an event log service. The event log can be a recordation of any of a set of occurrences/operations performed by any of the components of the vA 320. The blueprint configuration event topic can be associated with the creation, deletion or updating of a blueprint configuration and can be generated by a composition service. The resource reclamation completion event can represent a resource lease expiring and reclamation of the resource subject to the expired lease. The resource reclamation completion event can be generated by a resource management service. The business group configuration event topic can represent a business group being created, updated or deleted and can be generated by an identity service. The orchestration server configuration (XaaS) event topic can represent an orchestrator server configuration being created, updated, deleted or modified and can be generated by an advanced-designer service. The machine lifecycle event topic can represent an IaaS action being run on a provisioned machine and can be generated by an IaaS service. The machine provisioning event topic can represent an IaaS machine in the process of being provisioned and can be generated by an IaaS service.

Each event topic has an associated event schema. In some examples, when creating a workflow script to be executed in connection with a subscription, the workflow script can be configured to include input parameters (or a single input parameter) that use/consume all (or some) of the data included in the data fields of the event payload/schema. The name and type of such input parameters are defined to match the name and type specified in the event schema, for example. In some such examples, the subscription manager 470 extracts the event schema from the event message and supplies the extracted event schema as input parameters to the orchestrator 420 for use in executing the custom workflow script. In addition, the workflow script can be configured to generate output parameters that match a desired schema. Thus, the generated output parameters that result from executing the custom workflow script are supplied by the orchestrator 420 to the subscription manager 470 after the workflow script is executed and the subscription manager 470 includes the output parameters in a reply message transmitted back to the event broker 430 for subsequent usage by other workflow subscriptions and/or for use by the service that produced the event that triggered the workflow. In addition to input parameters, the subscription manager 470 supplies a workflow identifier and any other information needed by the orchestrator 420 to execute the workflow script.

For event topic subscribers, an event notification/message includes an event payload that identifies the event topic associated with the event notification (e.g. the event of interest) and includes event schema information. In some examples, upon receiving the event schema information, the subscription manager 470 processes the event schema information to identify an event of interest. Workflow information associated with the event is also sent to the orchestrator 420, which uses an associated workflow identifier (and, if appropriate, input parameters) to execute the workflow 420. In some examples, the workflow identifier indicates that a specialized workflow is to be executed. The specialized workflow can be a workflow containing tasks and/or steps embodied in and/or corresponding to an executable script that the tenant administrator entered at the tenant administrator work station 116 (see FIG. 1), for example. When this occurs, a storage address of the data storage 460 at which the script is stored can be transmitted to the workflow orchestrator 420. In some such examples, the workflow orchestrator 420 responds by executing the tasks/steps contained at the storage address of the data storage 460. In some examples, upon completion of the workflow, the workflow orchestrator 420 can notify the subscription manager 470. The subscription manager 470 can respond to the notification by notifying the event broker 430. In some examples, the notification transmitted to the event broker 430 can include information about any aspect of the subscription and/or about execution of the workflow, etc.

By way of example, Table 1 illustrates an example provisioning event topic schema. In this example, the provisioning event topic schema is related to the provisioning of a virtual machine. In the illustrated example, the machine is identified using an identifier, "id," a machine name, a machine identifier on the hypervisor, a machine owner, and a machine type. As illustrated, the machine can be a physical machine or a virtual machine and includes a set of properties. The machine properties can include a blueprint name, a component identifier, a component type identifier, an endpoint identifier, a request identifier and a lifecycle state that indicates a state, phase and event. In addition, the event schema includes a virtual machine event field, a workflow next state field, a virtual machine add or update properties field and a virtual machine delete properties field.

TABLE 1

Example Provisioning Event Topic Schema

```
{
  machine : {
      id                : STRING,   /* IaaS machine ID */
      name              : STRING,   /* machine name */
      externalReference : STRING,   /* machine ID on the hypervisor */
      owner             : STRING,   /* machine owner */
      type              : INTEGER,  /* machine type: 0 - virtual machine; 1 - physical machine; 2 - cloud machine */
      properties        : Properties /* machine properties, see notes below how to expose virtual machine properties */
  },
```

TABLE 1-continued

Example Provisioning Event Topic Schema

```
    blueprintName       : STRING,     /* blueprint name */
    componentId         : STRING,     /* component id */
    componentTypeId     : STRING,     /* component type id */
    endpointId          : STRING,     /* endpoint id */
    requestId           : STRING,     /* request id */
    lifecycleState      : {
                                       /* see Life Cycle State
Definitions*/
        state : STRING,
        phase : STRING,
        event : STRING
    },
    virtualMachineEvent                 : STRING,    /* fire an
event on that machine - only processed by Manager Service as
consumer */
    workflowNextState                   : STRING,    /* force the
workflow to a specific state - only processed by Manager Service as
consumer */
    virtualMachineAddOrUpdateProperties  : Properties,  /* properties
on the machine to add/update - only processed by Manager Service
as consumer */
    virtualMachineDeleteProperties      : Properties  /* properties to
remove from the machine - only processed by Manager Service
as consumer */
}
```

Based on the foregoing description, the example workflow subscription service implemented by the example vA 320 provides features that permit workflows to be triggered/executed based on a combination of events and user-selected/user-specified/machine-generated conditions. The workflow subscription system disclosed herein enables the triggering of additional workflow/workflow tasks by making selections (e.g., via a graphical user interface, program instructions, etc.). Further, the triggering of the workflow can be made contingent upon any number of conditions.

Figure 5:
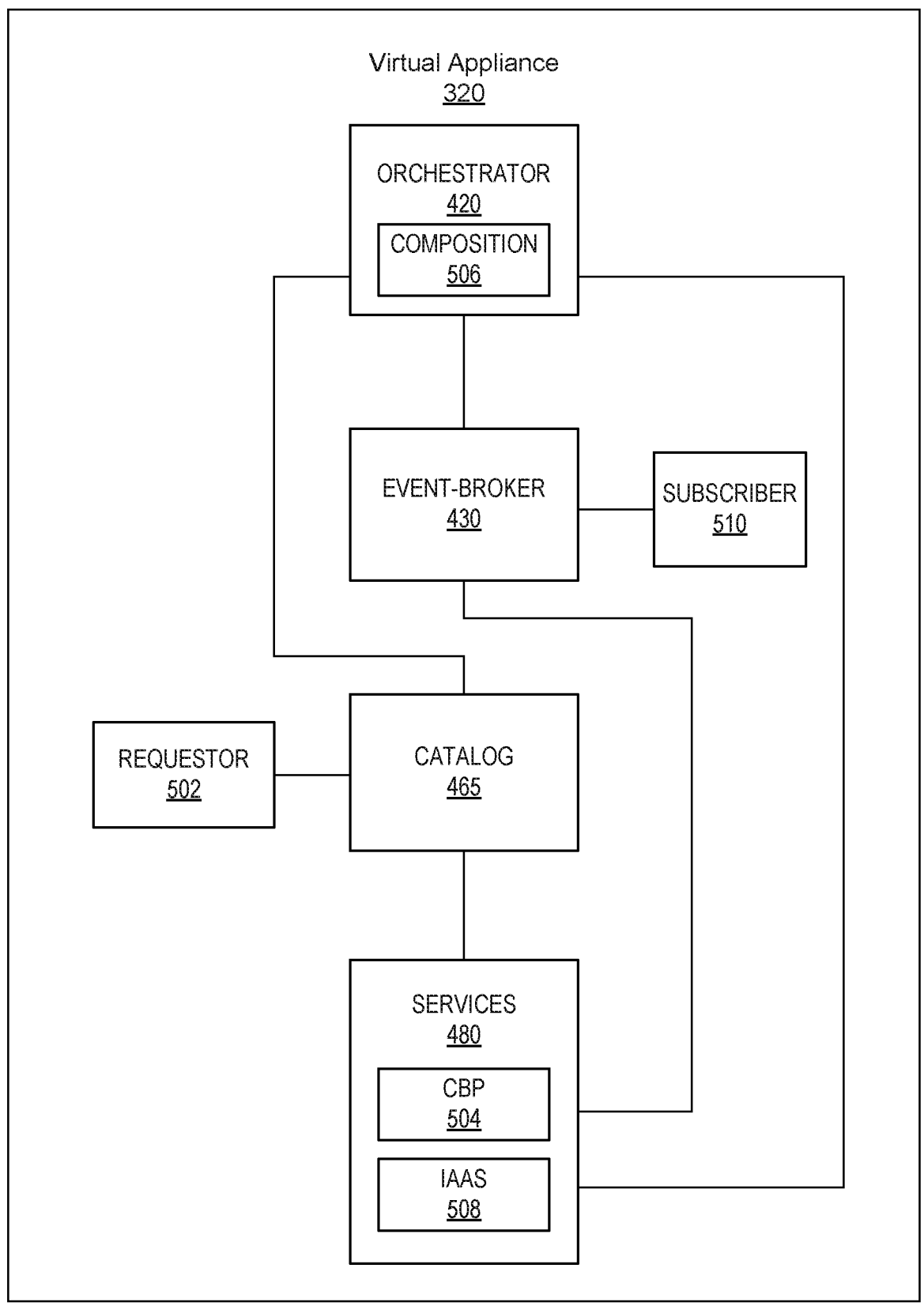
FIG. 5 illustrates an example implementation of a virtual appliance to process an example blueprint and manage associated subscription(s) according to subscription type, etc.

FIG. 5 illustrates an example implementation of the vA 320 to process an example blueprint 126 and manage associated subscription(s) according to subscription type, etc. As shown in the example of FIG. 5, a requester 502 requests the blueprint 126 from the catalog 465. The blueprint 126 can include a complex multi-machine service blueprint 208, for example, to define a complex multi-machine system 210 including a plurality of components 210A-210C and software and dependencies between components and software, for example. A complex blueprint service (CBP) 504 works with the catalog 465 and the orchestrator 420 to provision the blueprint 126, 208. The orchestrator 420 implements a composition 506 to provision a service 480 according to the blueprint 126, 208. For example, an IaaS 508 can be a service 480 provisioned by the composition 506 according to the blueprint 126, 208.

In certain examples, provisioning via the blueprint 126, 208 can occur via a container and/or other VM. In certain examples, a host environment spawns a container for code execution via an endpoint. For example, an application programming interface (API) call, such as a REST API call, etc., a user interface input, a stimulus, and/or trigger can launch execution of code in the container in the host environment. Code can be executed in an isolated, enclosed, detached, or "sandboxed" fashion using a container, for example. Thus, code snippets, scripts, etc., such as Java code, PowerShell™ script, Python code, etc., can be executed via the isolated environment of the container without affecting the rest of the virtual environment.

In certain examples, the repository 467 stores information to support infrastructure deployed using the virtual appliance 320. For example, endpoint information can be stored in the repository 467 (and/or the repository 134 of the example of FIG. 1).

Example Cloud Management and Endpoint Adapter Registration, Provisioning, and Operation In certain examples, the virtual appliance 320 and/or another implementation of the VM 114 is used to instantiate a multi-cloud compute management platform. To enable partners to extend the multi-cloud compute management platform to facilitate management of endpoints (e.g., cloud, hypervisor, etc.), a central repository 134 and/or 467 is provided for endpoint adapters (e.g., AliCloud™, VirtuStream™, SoftLAYER™, etc.). The repository 134 and/or 467 specifies the endpoint adapter and provides for a REST-based, API/contract for communication between the registered adapter and the platform.

In certain examples, the cloud provider 110 implements a plurality of VMs 114 and/or containers 114a in a deployed environment 112. Each endpoint adapter is run as a separated process in a container 114a, VM 114, physical machine. etc. The endpoint adapter is registered to a provisioning service endpoint adapter registry including metadata such as a uniform resource locator (URL) and/or other indicator of a location at which REST and/or other endpoints are enumerated (e.g., computes, networks, storages, etc.), provisioned resource, resource operations, monitoring, etc.

Once an endpoint adapter is registered to the system (e.g., added to the endpoint adapter registry), the endpoint adapter becomes a "first class citizen" giving the endpoint adapter native rights to multi-cloud management platforms access. Thus, for the platform, which provides compute, allocation, and/or other services, there is no difference between internal endpoint adapters and third party external endpoint adapters once the endpoint adapters are added to the endpoint registry. Using the endpoint registry, partners can deploy and manage resources from a hypervisor and/or cloud system. For example, cloud providers can be supported via the endpoint registry to deploy applications as a set of VMs with proper software installed on them. Additionally, while one VM 114 and/or container 114a supports the cloud management platform, other VMs 114 and/or containers 114a can support endpoints and interaction between the cloud management platform and external content, for example. Thus, if an external endpoint is corrupted and/or otherwise becomes unsupported, its VM 114/container 114a can be deactivated without impacting the VM 114/container 114a running the cloud management platform, for example.

In certain examples, a third party endpoint adapter must be incorporated into the cloud management platform. Previously, this was impossible without rewriting the code base and manually updating the API. However, certain examples enable a third party endpoint adapter to be added to the endpoint registry so that the platform can define a protocol and associated API for endpoints on the registry. The platform then does not distinguish between embedded endpoint adapters and added endpoint adapters that are on the endpoint registry. In certain examples, a registry entry for an endpoint includes metadata for the endpoint adapter and instructions for how the endpoint is called, etc. The endpoint adapter can execute in the same or different VM 114 and/or container 114a (e.g., virtual appliance 320, etc.) as the cloud management platform and/or other endpoints, for example. For example, the endpoint adapter can run in a separate process and register to the endpoint registry.

In certain examples, when an endpoint managed by a third party contributor adapter is to be added to the platform, a cloud management system host communicates with the external endpoint adapter to identify the endpoint adapter and add the endpoint adapter to the endpoint registry. The host can leverage an interface and the registry to communicate with the endpoint to install a new endpoint, register the endpoint, and remove the endpoint without impact to the rest of the hosted cloud system via the endpoint registry, for example.

Figure 6:
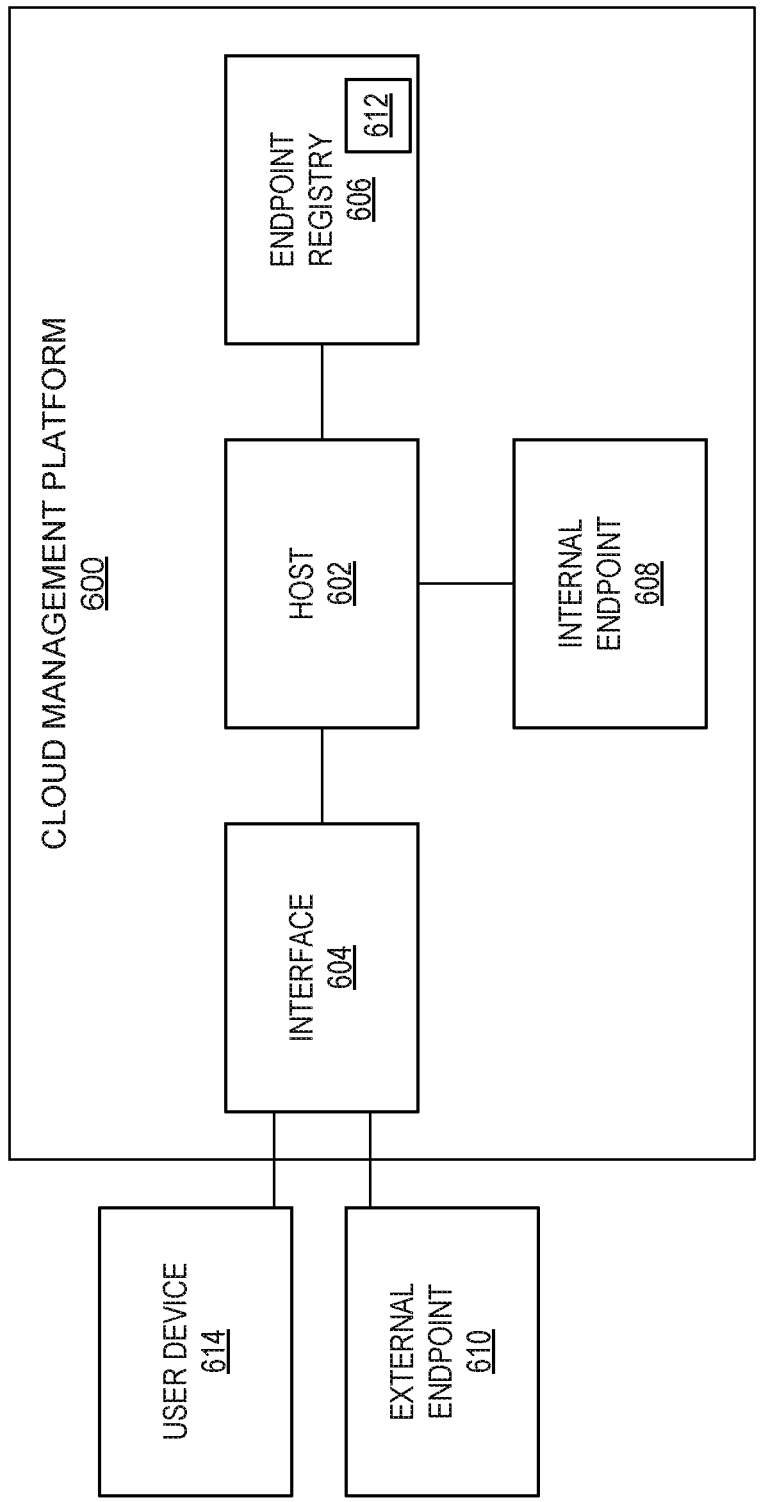
FIG. 6 illustrates an example cloud management platform.

For example, FIG. 6 illustrates an example VM 114 (e.g., a virtual appliance 320, etc.) configured as a cloud management platform 600. The example cloud management platform 600 includes a platform host 602, a platform interface 604, and an endpoint registry 606 to identify internal endpoint(s) 608, and external endpoint(s) 610. The example endpoint registry 606 includes an identification of one or more endpoint adapter(s) 612. A user device 614 can interact with the cloud management platform 600 via the interface 604 to register and/or access an endpoint using the endpoint registry 606, for example.

Using the example platform 600, one or more external devices 614 can deploy and manage resources from clouds and/or hypervisors that already have accounts with the platform 600. Applications can be deployed as a set of VMs with applicable software installed on them. For example, cloud providers can deploy applications as a set of VMs configured and installed with software via the multi-cloud management platform 600. Using the endpoint registry 606, an endpoint adapter 612 can be defined and incorporated into the platform 600 to be trusted and made available for execution (e.g., by the user device 614 and/or other process, etc.). The endpoint registry 606 includes an indication of the endpoint adapter 612, associated protocol and API(s), etc. External endpoints 610 and internal endpoints 608 are treated the same by the platform 600 once included in the registry 606. In the registry 606, metadata is registered with respect to the endpoint adapter 612 and in conjunction with an instruction/format/protocol regarding how to call and/or otherwise execute the endpoint adapter 612 to interact with the endpoint 608, 610, for example. The endpoint adapter 612 can run in the same or different VM 114 and/or container 114a as the cloud management platform 600, for example. For example, the endpoint adapter can execute in a separate process and register to the endpoint registry 606.

Figure 7:
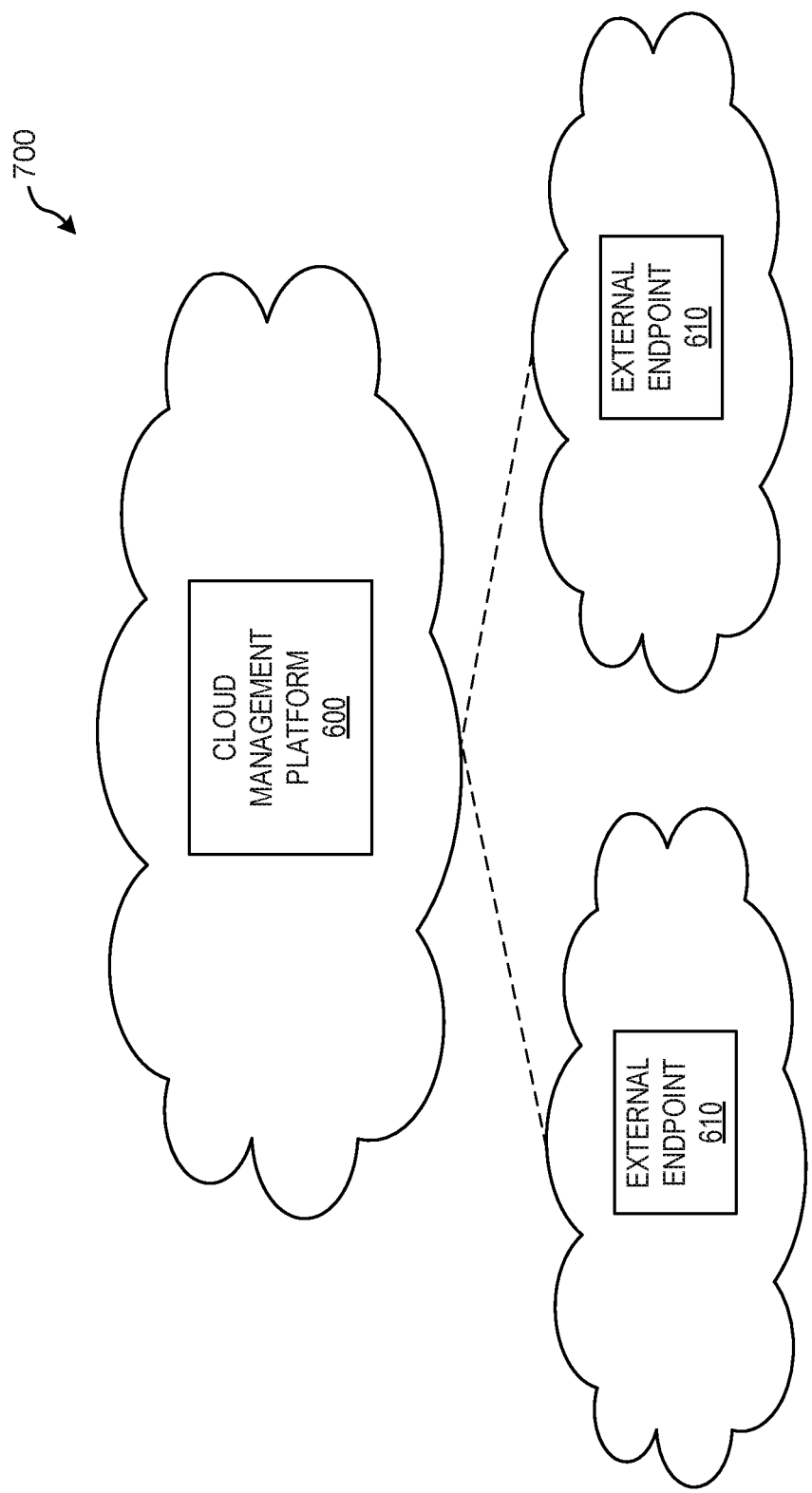
FIG. 7 illustrates an example multi-cloud management platform.

FIG. 7 illustrates an example system 700 configuration in which the platform 600 is implemented in one container 114a while external endpoints 610 are running in other containers 114a in communication with the container 114a running the cloud platform 600. In the example system 700 of FIG. 7, applications/services can leverage the endpoints 610 via the platform 600, but one or more of the endpoints 610 can easily be disconnected from the cloud platform 600 should such action be warranted (e.g., the endpoint container becomes too greedy for resources, is vulnerable to attack, etc.). Thus, when an endpoint 610 container 114a fails, it fails itself and does not impact the rest of the system 600, 700. Thus, partner(s) can register endpoint(s) 610 with the platform 600 to extend the platform 600 and provide load balancing and scalability in container(s) 114a and/or other VM(s) 114 apart from the platform 600. As shown in the example of FIG. 7, the platform 600 and external endpoints 610 can be on different networks and still communicate via the platform 600.

Figure 8:
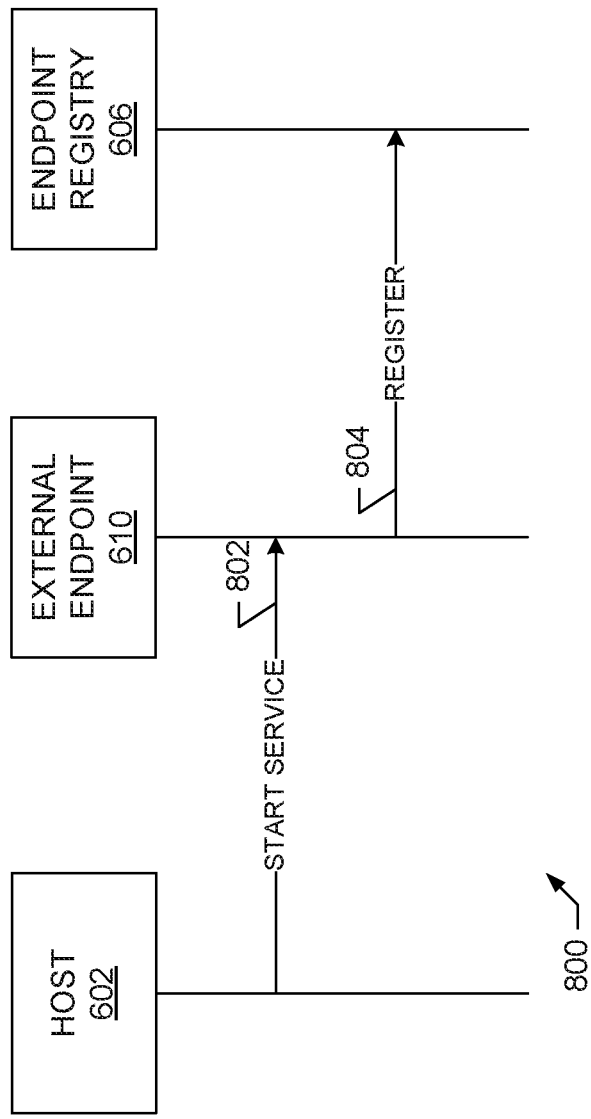
FIGS. 8-9 illustrate example data flows in the cloud management platform of FIGS. 6-7.
Figure 9:
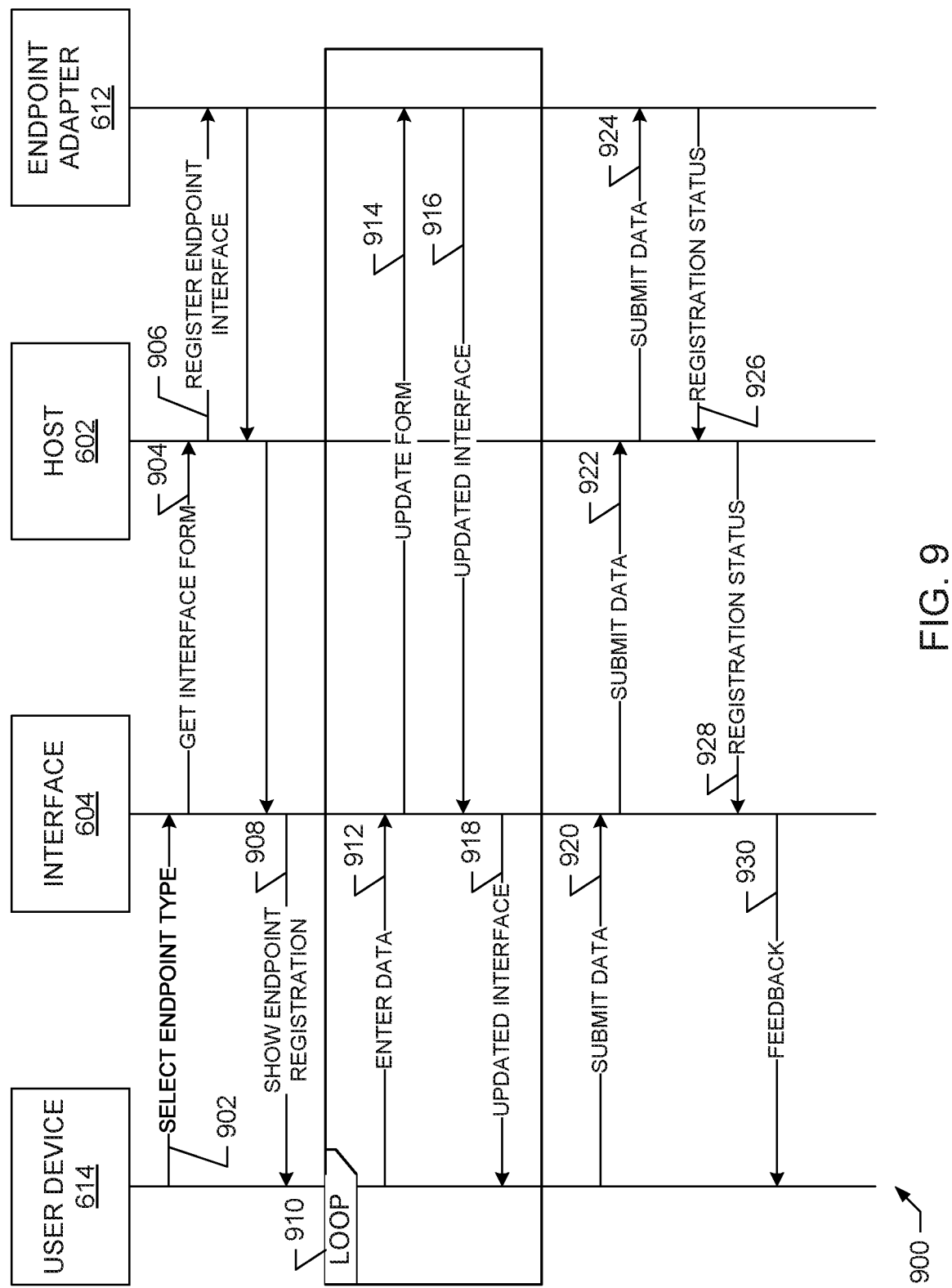

FIGS. 8-9 depict example data flow diagrams 800, 900 to register a new endpoint in the cloud management system 600. FIG. 8 shows an example data flow 800 to initiate registration by the cloud platform host 602 with the external endpoint 610. At 802, the cloud platform host 602 starts a registration service to communicate with the external endpoint 610. The initiation of the service triggers the external endpoint 610 to register 804 with the endpoint registry 606. Thus, the host 602 starts all services, including dynamic services. When an external (e.g., non-embedded) service is started, the service registers metadata from the endpoint 610 to the endpoint registry service 606. The endpoint registry or endpoint registry service 606 is a stateful service that maintains information about all registered endpoints 608, 610.

In certain examples, an endpoint instance can be created via the endpoint service 802 triggered by the host 602. The endpoint service validates data provided against a schema for the endpoint 610 and retrieves the endpoint 610 (e.g., an IaaS repository endpoint, etc.) from the endpoint component registry 606. The endpoint 610 can be updated based on new configuration, data, etc., and the service 802 can be called to save the updated endpoint data with the registry 606. A provider of the data (e.g., the platform host 602, user device 614, etc.) can then receive an indication of endpoint update success, for example.

In certain examples, the user device 614 seeks to manage (e.g., enumerate/discover, provision/destroy, power on/off, etc.) resources such as VMs, containers, etc., on a given endpoint 608, 610 such as a hypervisor, a public cloud, a physical endpoint, etc. An endpoint developer seeks to quickly implement and easily deploy and register an endpoint with the cloud management platform host 602. FIG. 9 shows an example data flow 900 for the user device 614 to register a new external endpoint 610 and its endpoint adapter 612 with the endpoint registry 606.

At 902, the user device 614 selects an endpoint type (e.g., hypervisor, cloud, physical endpoint, etc.) via the interface 604. At 904, the interface 604 retrieves an interface form corresponding to the endpoint type from the host 602. At 906, the host 602 requests an endpoint registration interface from the endpoint adapter 612. The endpoint adapter 612 provides the endpoint registration interface to the platform interface 604 via the host 602, and, at 908, the interface 604 shows the endpoint registration interface to the user device 614.

At 910, a loop is triggered to gather data and generate an interface to register the endpoint 610 via the endpoint adapter 612. At 912, data is provided from the user device 614 to the interface 604, which updates the interface form 914 and provides the form to the endpoint adapter 612. The endpoint adapter 612 responds to the added data by generating an updated interface 916 and sending the updated interface back to the platform interface 604. The platform interface 604 provides the updated registration interface 918 to the user device 614, which continues in the loop 910 to enter data until all data for the endpoint registration has been entered.

At 920, the user device 614 submits the completed data set to the interface 604, which, in turn, submits the data 922 to the host 602. The host 602 provides the data 924 to the endpoint adapter 612, which accepts and processes the data and generates a registration status 926 (e.g., successful registration, registration failure, more information needed, approval needed, etc.) for the host 602. At 928, the host 602 provides the registration status to the interface 604, which provides 930 feedback to the user device 614.

Thus, in certain examples, when an endpoint 610 managed by a third party contributor adapter is to be added, the user device 614 connects to the interface 604, and the interface 604 is in communication with the host 602, which is in communication with the endpoint adapter 612. The host 602, via the endpoint adapter 612, provides metadata from available endpoint adapter(s) 612 in the registry 606 so that the user device 614 can determine which adapter to use. If the selected endpoint adapter is a third party external endpoint adapter 612, data is provided by the user device 614 to establish communication with the endpoint adapter 612 through the multi-cloud management system host 602 (e.g., reverse proxy). Data is sent by the endpoint adapter 612 to the platform interface 604 and made available to the user device 614. The user device 614 can submit data to register a cloud account, for example, and the partner endpoint adapter 612 can provide additional metadata such as project, region(s), etc. The user device 614 can select a project to manage, and the selection is submitted to the platform interface 604, which provides the selection via reverse proxy to the host 602, which interprets the user data and communicates with the endpoint adapter 612. The endpoint adapter 612 responds with feedback to let the host 602 and the user device 614 know how the submitted request has been processed by the endpoint 610, for example.

In certain examples, cloud accounts can be registered as administrator endpoints 610 and stored in the endpoint registry 606. Other third party adapters can be stored in the registry 606 as well (also referred to as a component registry).

In certain examples, the interface 604 can be implemented and provided in a plurality of ways. For example, the interface 604 can be implemented as a data-driven interface in which the external endpoint 610 registers an endpoint registration schema (e.g., URL, user identification, password, tenant, etc.). Such a data-driven interface can be technology-agnostic so that third parties do not have to be bound to a particular concrete interface technology, and the interface 604 can instead evolve to new technology, library, paradigm, etc. However, a complex schema (model) is used to describe complex interfaces including dependencies, steps, and/or phases to enter connection/credential details, etc.

In other examples, the interface 604 can be implemented as a content interface such that the platform host 602 asks the endpoint adapter 612 (on a certain endpoint 610 with endpoint registration metadata, etc.) to provide the interface form (e.g. HTML, JavaScript, etc.). Such as content-driven interface can include an ability to provide very complex interfaces via the endpoint adapter 612. The interface 604 is defined in a particular framework, technology, paradigm, and/or library, for example. The interface provided by the endpoint adapter 612 uses a concrete framework to describe a desired state, for example.

For example, in an OpenStack (VIO) case, the endpoint registration form asks the user device 614 for a URL, user and password, and then queries the backend (e.g., host 602 and endpoint adapter 612) for projects or tenants and allows the user device 614 to select a project for which to register the current endpoint 610.

In certain examples, a photon model endpoint adapter registry 606 is part of a photon model that provides a unified model for systems and application management across multiple infrastructures for which photon adapters have been written. Photon model APIs can be used to deploy and manage systems, from applications to infrastructure, in a single coherent model and implementation. The photon model can enumerate and synchronize both photon APIs and customer native APIs (e.g. from on-premise and/or cloud providers) and associated state resources, for example. Thus, the photon model enables application management as a service across public and private clouds.

An example photon-model-adapter endpoint registry model can be represented as follows:
AdapterEndpointConfig
id*: String (the endpoint identifier/type e.g. openstack, virtustream, softlayer, etc.)
name*: String (endpoint name that can be human readable, 110n, i18n, etc.)
customProperties: Map<String,String> for various props (this is derived from ResourceState)
  icon provided by convention as an entry in the map with key 'icon' and value, and a path to the icon resource (e.g., resources/openstack/static-content/openstack.png)
adapterEndpoints: Map<String,String> which keeps mapping an endpoint/service type to a service/factory link
  key: String (the endpoint type, e.g. ENDPOINT_CONFIG_ADAPTER, ENDPOINT_CONFIG_ADAPTER_UI, PROVISIONING_ADAPTER, INSTANCE_ADAPTER, ENUMERATION_ADAPTER, POWER_ADAPTER, etc.)
  link: String (the Service's SELF_LINK)

The photon model adapter registry is part of the photon model and is used to help minimize the requirements (dependencies) towards third party adapter implementations (e.g., to depend on photon-model and xenon only), for example.

While an example manner of implementing an endpoint registry in a cloud computing environment is illustrated in FIGS. 1-9, one or more of the elements, processes and/or devices illustrated in FIGS. 1-9 may be combined, divided, re-arranged, omitted, eliminated and/or implemented in any other way. Further, the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provisioner 410, example orchestrator 420, example event broker 430, example authentication provider 440, example internal reverse proxy 450, example data storage 460, example catalog 465, example repository 467, example subscription manager 470, example services 480, example requestor 502, example composition blueprint service 504, example composition 506, example IaaS 508, example subscriber 510, example cloud management platform 600, example host 602, example interface 604, example endpoint registry 606, example internal endpoint 608, example external endpoint 610, example endpoint adapter 612, example user device 614, and/or, more generally, the example system 100, 300, 600 of FIGS. 1-9 can be implemented by hardware, software, firmware and/or any combination of hardware, software and/or firmware. Thus, for example, any of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provisioner 410, example orchestrator 420, example event broker 430, example authentication provider 440, example internal reverse proxy 450, example data storage 460, example catalog 465, example repository 467, example subscription manager 470, example services 480, example requestor 502, example composition blueprint service 504, example composition 506, example IaaS 508, example subscriber 510, example cloud management platform 600, example host 602, example interface 604, example endpoint registry 606, example internal endpoint 608, example external endpoint 610, example endpoint adapter 612, example user device 614, and/or, more generally, the example system 100, 300, 600 of FIGS. 1-9 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provisioner 410, example orchestrator 420, example event broker 430, example authentication provider 440, example internal reverse proxy 450, example data storage 460, example catalog 465, example repository 467, example subscription manager 470, example services 480, example requestor 502, example composition blueprint service 504, example composition 506, example IaaS 508, example subscriber 510, example cloud management platform 600, example host 602, example interface 604, example endpoint registry 606, example internal endpoint 608, example external endpoint 610, example endpoint adapter 612, example user device 614, and/or, more generally, the example system 100, 300, 600 of FIGS. 1-9 is/are hereby expressly defined to include a tangible computer readable storage device or storage disk such as a memory, a digital versatile disk (DVD), a compact disk (CD), a Blu-ray disk, etc. storing the software and/or firmware. Further still, the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provisioner 410, example orchestrator 420, example event broker 430, example authentication provider 440, example internal reverse proxy 450, example data storage 460, example catalog 465, example repository 467, example subscription manager 470, example services 480, example requestor 502, example composition blueprint service 504, example composition 506, example IaaS 508, example subscriber 510, example cloud management platform 600, example host 602, example interface 604, example endpoint registry 606, example internal endpoint 608, example external endpoint 610, example endpoint adapter 612, example user device 614, and/or, more generally, the example system 100, 300, 600 of FIGS. 1-9 may include one or more elements, processes and/or devices in addition to, or instead of, those illustrated in FIGS. 1-9, and/or may include more than one of any or all of the illustrated elements, processes and devices.

Figure 10:
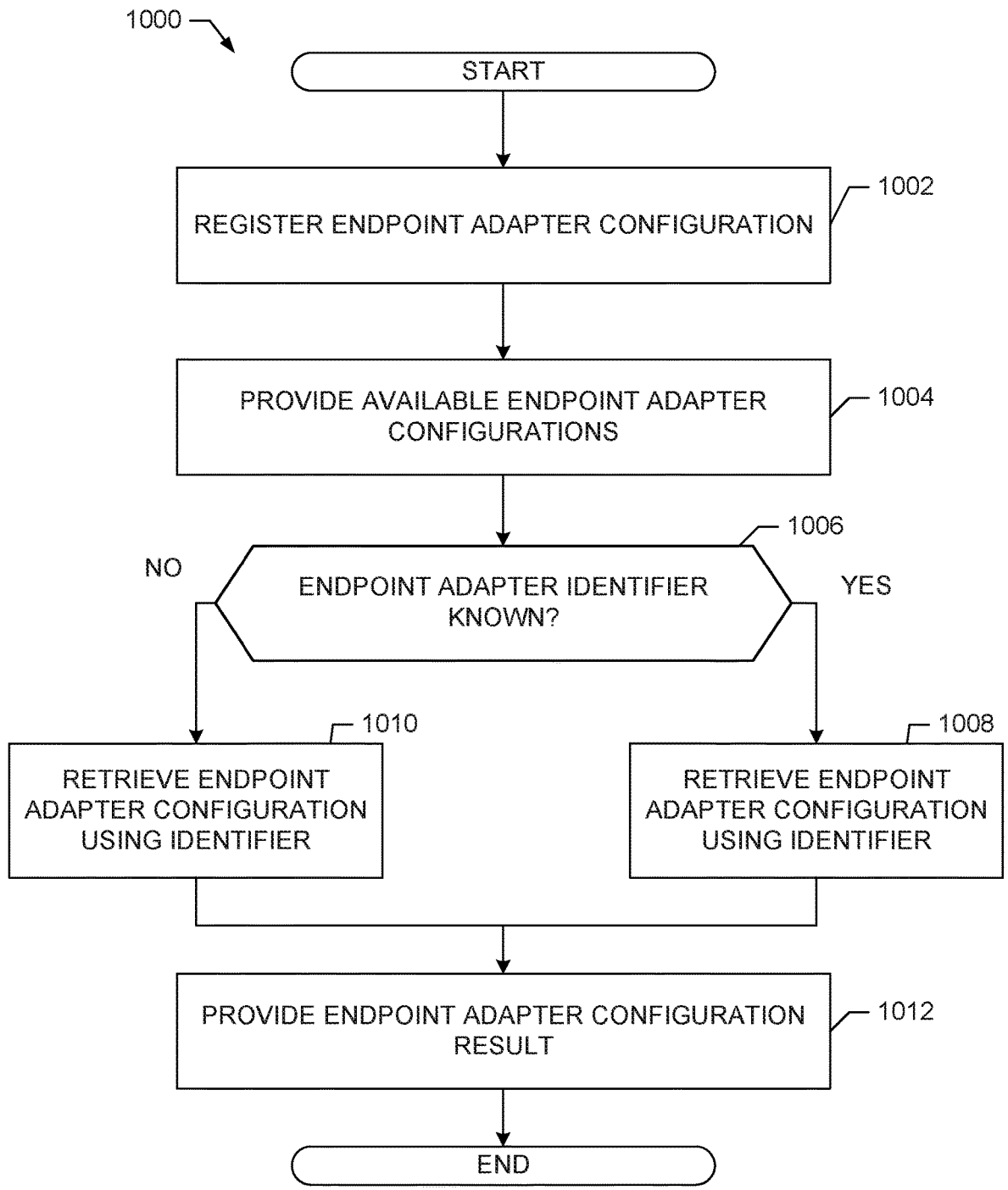
FIGS. 10-11 depict flowcharts representative of computer readable instructions that may be executed to implement the cloud management platform of FIGS. 1-9.
Figure 11:
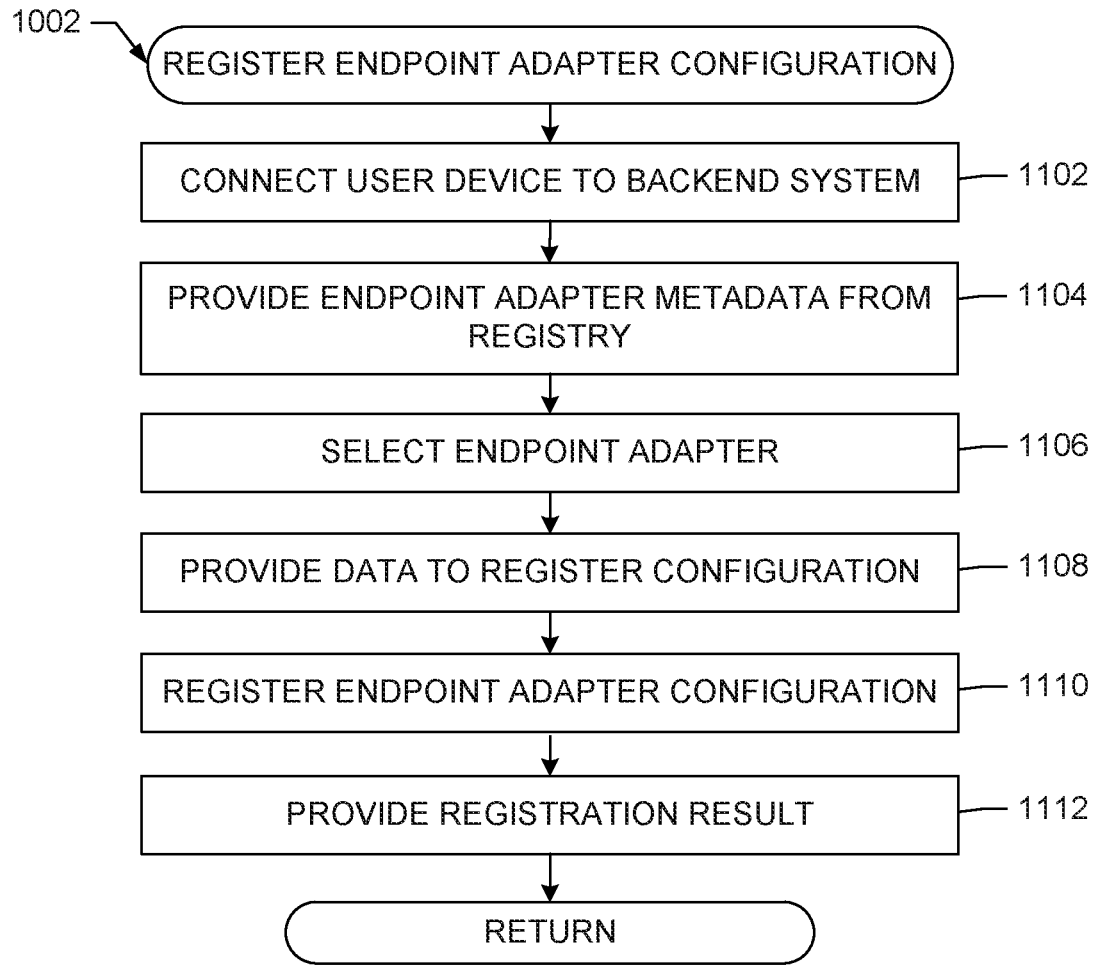

Flowcharts representative of example machine readable instructions that may be executed to implement the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provisioner 410, example orchestrator 420, example event broker 430, example authentication provider 440, example internal reverse proxy 450, example data storage 460, example catalog 465, example repository 467, example subscription manager 470, example services 480, example requestor 502, example composition blueprint service 504, example composition 506, example IaaS 508, example subscriber 510, example cloud management platform 600, example host 602, example interface 604, example endpoint registry 606, example internal endpoint 608, example external endpoint 610, example endpoint adapter 612, example user device 614, and/or, more generally, the example system 100, 300, 600 of FIGS. 1-9 are shown in FIGS. 10-11. In these examples, the machine readable instructions implement programs for execution by a processor such as the processor 1212, 1312, and/or 1412 shown in the example processor platform 1200-1400 discussed below in connection with FIGS. 12-14. The programs may be embodied in software stored on a tangible computer readable storage medium such as a CD-ROM, a floppy disk, a hard drive, a digital versatile disk (DVD), a Blu-ray disk, or a memory associated with the processor 1212-1412, but the entire program and/or parts thereof could alternatively be executed by a device other than the processor 1212-1412 and/or embodied in firmware or dedicated hardware. Further, although the example programs are described with reference to the flowcharts illustrated in FIGS. 10-11, many other methods of deploying, evaluating, and installing services on component servers in accordance with the teachings of this disclosure may alternatively be used. For example, the order of execution of the blocks may be changed, and/or some of the blocks described may be changed, eliminated, or combined.

As mentioned above, the example processes of FIGS. 10-11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example processes of FIGS. 10-11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 10 depicts a flowchart representative of computer readable instructions that may be executed to implement endpoint registration in the virtual cloud management system 600, 700. An example program 1000 is illustrated in FIG. 10. At block 1002, an endpoint adapter configuration is registered. For example, the user device 614 interacts with the host 602 via the interface 604 to provide information to register an endpoint 610 and associated endpoint adapter 612 with the endpoint registry 606. Once registered, the endpoint adapters 612 can be made available for access to endpoint 610 instances via the registry 606.

At block 1004, a list or set of available endpoint adapter configurations is provided. For example, the registry 606 can provide a list or set of available endpoint adapter configurations to the platform host 602, which can surface them via the interface 604.

At block 1006, if known, an endpoint adapter configuration is retrieved (block 1008) based on an identifier. For example, the user device 614 can query the list/set of endpoint adapters 612 made available via the interface 604 based on an identifier associated with a particular endpoint 610 or associated endpoint adapter 612. At block 1010, if the identifier is unknown, then the list or set of endpoint adapter configurations can be queried by a criterion such as endpoint type. For example, the user device 614 can query the list/set of endpoint adapters 612 made available via the interface 604 based on a desired type of endpoint (e.g., hypervisor, private cloud, SaaS, IaaS, etc.). At block 1012, the endpoint adapter configuration result is provided to the user device 614. For example, based on the query from the user device 614, the interface 604 provides a selection to the host 602, which queries the endpoint registry 606 for the desired endpoint adapter configuration. The result is then passed back to the host 602, which provides the configuration to the user device 614 via the interface 604, for example.

FIG. 11 provides further detail regarding an implementation of registering an endpoint adapter 612 configuration (block 1002) of the example flow diagram of FIG. 10. At block 1102, the user device 614 connects to a backend system (e.g., the multi-cloud management platform 600). At block 1104, the backend system provides metadata identifying endpoint adapters 612 in the registry 606. At block 1106, an endpoint adapter 612 is selected by the user device 614 from the registry 606. At block 1108, the user device 614 provides data to register the endpoint 610 and its adapter configuration using the endpoint adapter 612 definition in the endpoint registry 606.

At block 1110, the endpoint adapter configuration is registered with the backend system. For example, the configuration is noted as metadata in connection with the endpoint adapter 612 in the endpoint registry 606. At block 1112, a result of the registration is provided. For example, feedback regarding a result of the registration is provided to the user device 614 via the host 602 and interface 604. The endpoint adapter 612 is then available for use.

Figure 12:
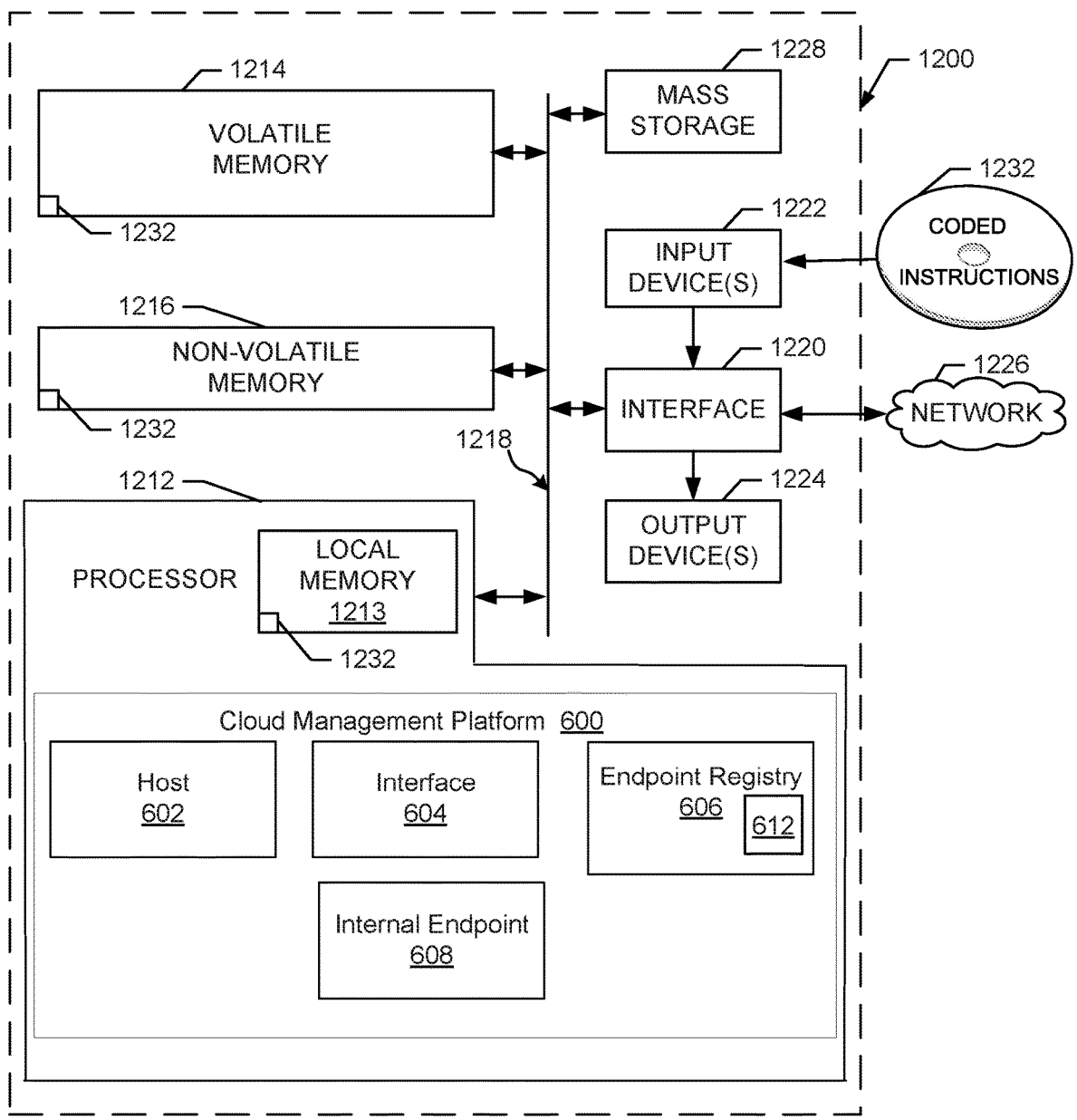
FIGS. 12-14 are block diagrams of example processing platforms structured to execute the example computer readable instructions of FIGS. 10-11 to implement the example systems and flows of FIGS. 1-9.

FIG. 12 is a block diagram of an example processor platform 1700 structured to execute the instructions of FIGS. 10-11 to implement the example systems, operation, and management of FIGS. 1-9. The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache), and executes instructions to implement the example cloud management platform or system 600 or portions thereof, such as the example host 602, interface 604, registry 606, and/or internal endpoint 608. The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a keyboard, a button, a mouse, a touchscreen, a track-pad, a trackball, isopoint and/or a voice recognition system. In some examples, the input device(s) 1222 are used to implement the tenant administrator work station 116 (see FIG. 1).

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor. In some examples, the output device(s) 1224 are used to implement the tenant administrator work station 116 (see FIG. 1).

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include flash devices, floppy disk drives, hard drive disks, optical compact disk (CD) drives, optical Blu-ray disk drives, RAID systems, and optical digital versatile disk (DVD) drives.

Coded instructions 1232 representative of the example machine readable instructions of FIGS. 10-11 may be stored in the mass storage device 1228, in the volatile memory 1214, in the non-volatile memory 1216, and/or on a removable tangible computer readable storage medium such as a CD or MID.

In the example of FIG. 12, the processor 1212 implements the example cloud management platform or system 600 including the example host 602, interface 604, registry 606, and/or internal endpoint 608, etc. In certain examples, as discussed herein, the hardware of processor 1212 is virtualized using virtualization such as VMs and/or containers.

Figure 13:
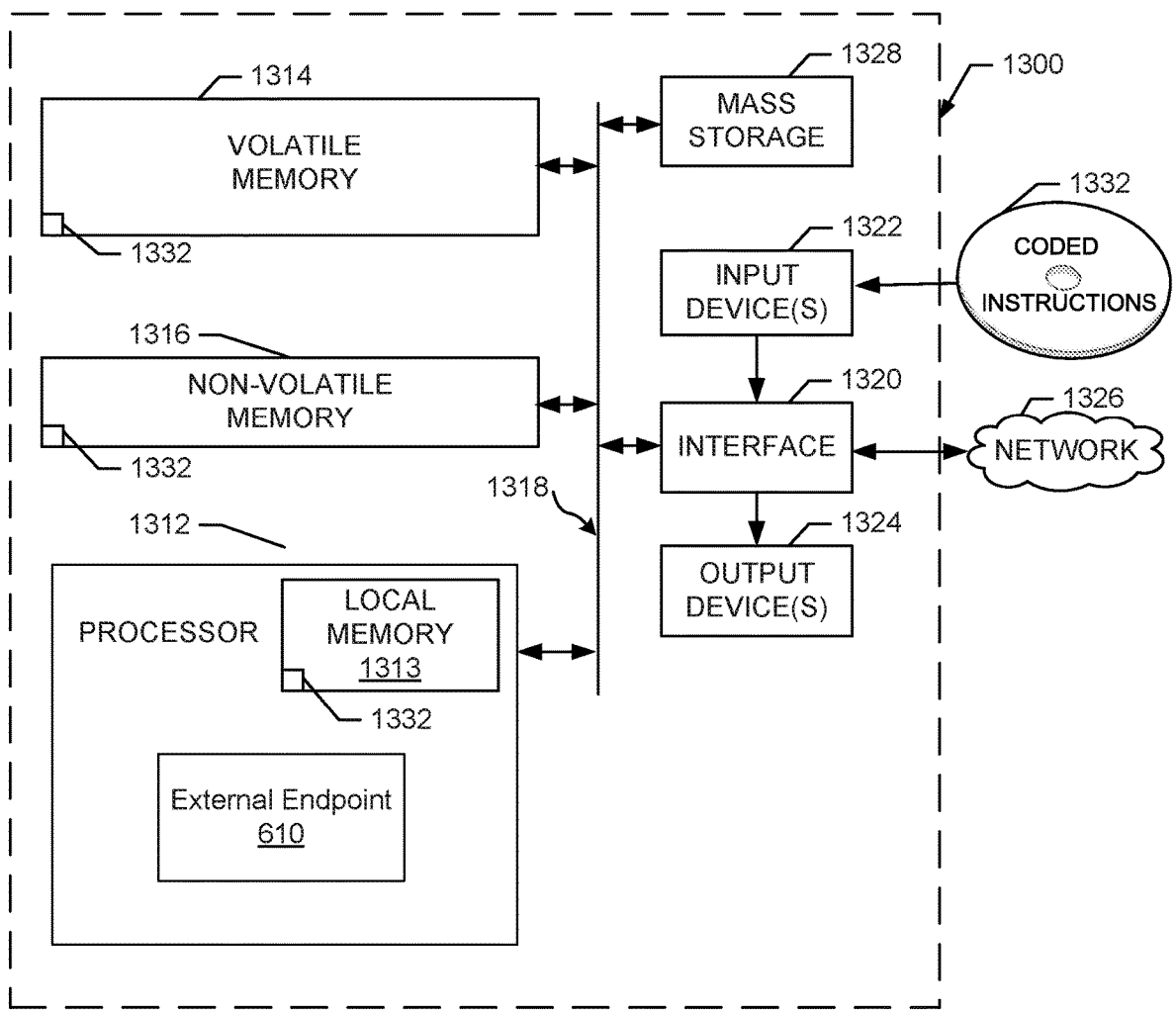

FIG. 13 is a block diagram of an example processor platform 1700 structured to execute the instructions of FIGS. 10-11 to implement the example systems, operation, and management of FIGS. 1-9. The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache), and executes instructions to implement the example cloud management platform or system 600 or portions thereof, such as the example external endpoint 610. The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a keyboard, a button, a mouse, a touchscreen, a track-pad, a trackball, isopoint and/or a voice recognition system. In some examples, the input device(s) 1322 are used to implement the tenant administrator work station 116 (see FIG. 1).

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor. In some examples, the output device(s) 1324 are used to implement the tenant administrator work station 116 (see FIG. 1).

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include flash devices, floppy disk drives, hard drive disks, optical compact disk (CD) drives, optical Blu-ray disk drives, RAID systems, and optical digital versatile disk (DVD) drives.

Coded instructions 1332 representative of the example machine readable instructions of FIGS. 10-11 may be stored in the mass storage device 1328, in the volatile memory 1314, in the non-volatile memory 1316, and/or on a removable tangible computer readable storage medium such as a CD or DVD.

In the example of FIG. 13, the processor 1312 implements the example external endpoint 610, etc. In certain examples, as discussed herein, the hardware of processor 1312 is virtualized using virtualization such as VMs and/or containers.

Figure 14:
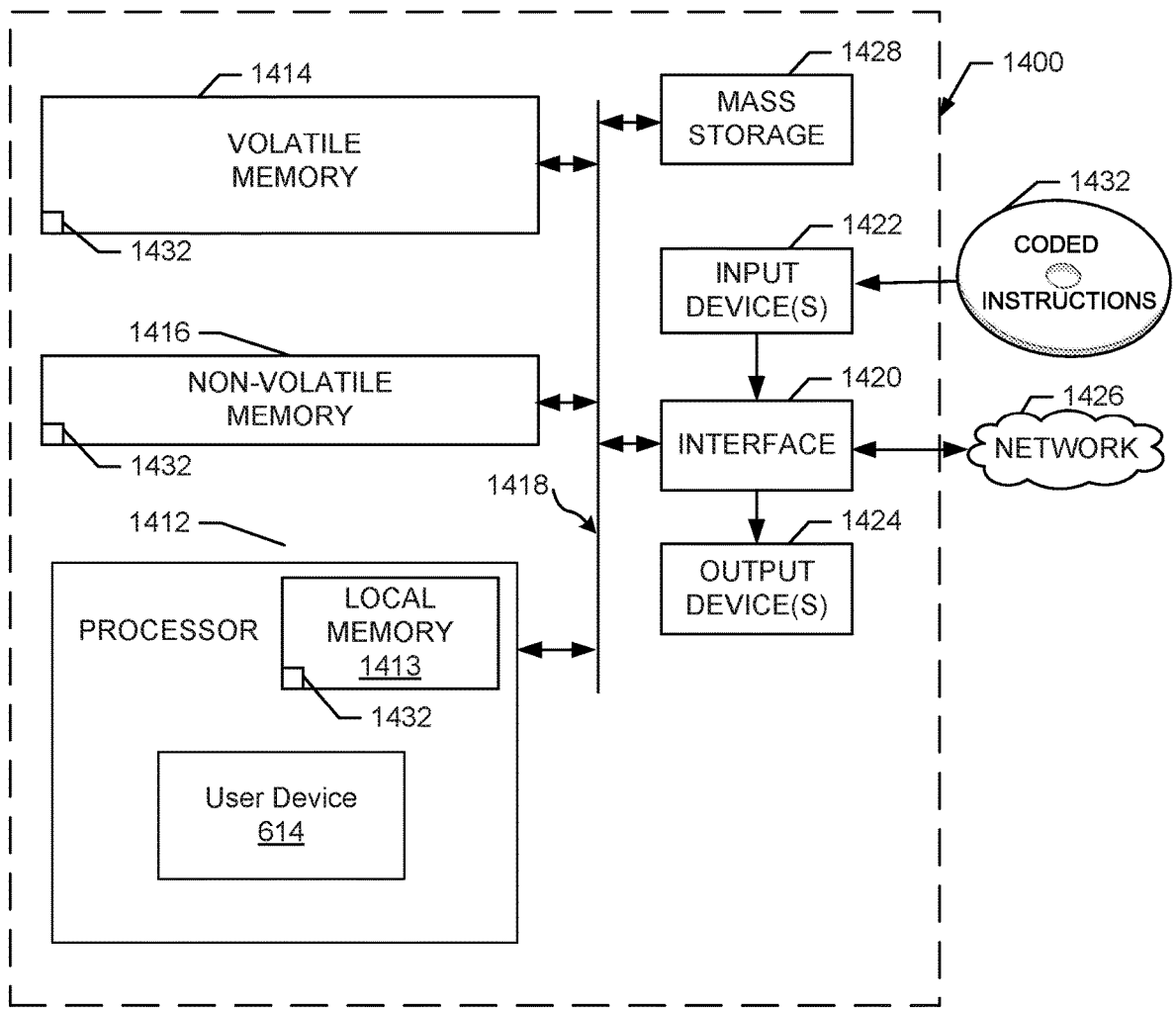

FIG. 14 is a block diagram of an example processor platform 1700 structured to execute the instructions of FIGS. 10-11 to implement the example systems, operation, and management of FIGS. 1-9. The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer.

The processor 1412 of the illustrated example includes a local memory 1413 (e.g., a cache), and executes instructions to implement the example cloud management platform or system 600 or portions thereof, such as the example user device 614. The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a keyboard, a button, a mouse, a touchscreen, a track-pad, a trackball, isopoint and/or a voice recognition system. In some examples, the input device(s) 1422 are used to implement the tenant administrator work station 116 (see FIG. 1).

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1420 of the illustrated example, thus, typically includes a graphics driver card, a graphics driver chip or a graphics driver processor. In some examples, the output device(s) 1424 are used to implement the tenant administrator work station 116 (see FIG. 1).

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include flash devices, floppy disk drives, hard drive disks, optical compact disk (CD) drives, optical Blu-ray disk drives, RAID systems, and optical digital versatile disk (DVD) drives.

Coded instructions 1432 representative of the example machine readable instructions of FIGS. 10-11 may be stored in the mass storage device 1428, in the volatile memory 1414, in the non-volatile memory 1416, and/or on a removable tangible computer readable storage medium such as a CD or DVD.

In the example of FIG. 14, the processor 1412 implements the example user device 614, etc. In certain examples, as discussed herein, the hardware of processor 1412 is virtualized using virtualization such as VMs and/or containers.

From the foregoing, it will be appreciated that the above disclosed methods, apparatus, and articles of manufacture have been disclosed to register endpoints and/or associated endpoint adapters with a virtual cloud management platform. The disclosed methods, apparatus and articles of manufacture improve the operation of a computing device (real and/or virtual) and management platform by separating endpoints from the core cloud management platform, enabling partners to add endpoints and enabling the cloud management platform to disconnect or delete adapters to those endpoints without negatively impacting the rest of the system. The disclosed methods, apparatus and articles of manufacture are accordingly directed to one or more improvement(s) in the functioning of a computer.

Thus, certain examples improve provisioning of virtual computing resources in an environment, such as a cloud computing environment. Certain examples provide a technical improvement of reverse proxy management of endpoints and user devices organized by the cloud platform host in a central registry/repository. Certain examples enable endpoints to run in sandboxed fashion on a virtual machine or container separate from a VM/container hosting the cloud management platform. Thus, the cloud management platform has separation from and control of connected endpoints to enable/connect and disable/disconnect them through associated adapters and can treat external endpoints as internal endpoints through the handshake data exchange and registration with the platform host and endpoint registry.

Certain examples provide a cloud management system including: an interface to communicate with an external device; a host to manage requests and allocate resources through one or more virtual machines; and an endpoint registry to include an endpoint adapter and metadata defining the endpoint adapter, the endpoint adapter to specify communication between at least one of the host or the external device and an endpoint. In the example cloud management system, the host is to at least enable, via the interface, the external device to access the endpoint registry a) to register an endpoint adapter configuration with the endpoint registry and b) to retrieve the endpoint adapter configuration from the endpoint registry.

In certain examples, the endpoint adapter, when launched by the external device, is to run as a separate process in a separate virtual machine or container from the host. In certain examples, the host is to deactivate the separate virtual machine or container running the endpoint adapter when the separate virtual machine or container is compromised. In certain examples, the endpoint registry is to include a first endpoint adapter for an internal endpoint and a second endpoint adapter for an external endpoint. In certain examples, the host is to treat the external endpoint the same as the internal endpoint once the second endpoint adapter is registered with the endpoint registry. In certain examples, the host is to trigger a registration service to initiate registration of the endpoint and the endpoint registry. In certain examples, the host is to serve as a reverse proxy between the external device and the endpoint adapter via the interface.

Certain examples provide a non-transitory computer-readable storage medium including computer readable instructions that, when executed, cause at least one processor to at least implement a cloud management platform. The example cloud management platform includes: an interface to communicate with an external device; a host to manage requests and allocate resources through one or more virtual machines; and an endpoint registry to include an endpoint adapter and metadata defining the endpoint adapter, the endpoint adapter to specify communication between at least one of the host or the external device and an endpoint. In the example cloud management system, the host is to at least enable, via the interface, the external device to access the endpoint registry a) to register an endpoint adapter configuration with the endpoint registry and b) to retrieve the endpoint adapter configuration from the endpoint registry.

In certain examples, the endpoint adapter, when launched by the external device, is to run as a separate process in a separate virtual machine or container from the host. In certain examples, the host is to deactivate the separate virtual machine or container running the endpoint adapter when the separate virtual machine or container is compromised. In certain examples, the endpoint registry is to include a first endpoint adapter for an internal endpoint and a second endpoint adapter for an external endpoint. In certain examples, the host is to treat the external endpoint the same as the internal endpoint once the second endpoint adapter is registered with the endpoint registry. In certain examples, the host is to trigger a registration service to initiate registration of the endpoint and the endpoint registry. In certain examples, the host is to serve as a reverse proxy between the external device and the endpoint adapter via the interface.

Certain examples provide a method including: connecting, by executing an instruction using at least one processor, a user device to a host of a cloud management platform; providing, by executing an instruction using the at least one processor, endpoint adapter metadata from an endpoint registry to enable selection of an endpoint adapter; accepting, by executing an instruction using the at least one processor, a selection of the endpoint adapter; registering, by executing an instruction using the at least one processor, an endpoint adapter configuration for the selected endpoint adapter using data provided by the user device; and providing, by executing an instruction using the at least one processor, a registration result to the user device.

In certain examples, the method further includes launching the endpoint adapter as a separate process in a separate virtual machine or container from the host. In certain examples, the method further includes deactivating the separate virtual machine or container running the endpoint adapter when the separate virtual machine or container is compromised. In certain examples, the method further includes triggering, via the host, a registration service to initiate registration of the endpoint and the endpoint registry. In certain examples, the endpoint registry is to include a first endpoint adapter for an internal endpoint and a second endpoint adapter for an external endpoint. In certain examples, the host is to treat the external endpoint the same as the internal endpoint once the second endpoint adapter is registered with the endpoint registry.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A cloud management system comprising:
an interface to communicate with an external device;
a host to manage requests and allocate resources through one or more virtual machines; and
an endpoint registry including an endpoint adapter and metadata defining the endpoint adapter to enable selection of the endpoint adapter, the endpoint adapter to specify communication between at least one of the host or the external device and an endpoint,
wherein the host is to at least enable, via the interface, the external device a) to access the endpoint registry to register an endpoint adapter configuration with the endpoint registry using data provided by the external device, b) to retrieve the endpoint adapter configuration from the endpoint registry, and c) to provide a registration result to the external device.

2. The system of claim 1, wherein the endpoint adapter, when launched by the external device, is to run as a separate process in a separate virtual machine or container from the host.

3. The system of claim 2, wherein the host is to deactivate the separate virtual machine or container running the endpoint adapter when the separate virtual machine or container is compromised.

4. The system of claim 1, wherein the endpoint registry is to include a first endpoint adapter for an internal endpoint and a second endpoint adapter for an external endpoint.

5. The system of claim 4, wherein the host is to treat the external endpoint the same as the internal endpoint once the second endpoint adapter is registered with the endpoint registry.

6. The system of claim 1, wherein the host is to trigger a registration service to initiate registration of the endpoint and the endpoint registry.

7. The system of claim 1, wherein the host is to serve as a reverse proxy between the external device and the endpoint adapter via the interface.

8. A non-transitory computer-readable storage medium comprising computer readable instructions that, when executed, cause at least one processor to at least implement a cloud management platform, the cloud management platform comprising:
an interface to communicate with an external device;
a host to manage requests and allocate resources through one or more virtual machines; and
an endpoint registry including an endpoint adapter and metadata defining the endpoint adapter to enable selection of the endpoint adapter, the endpoint adapter to specify communication between at least one of the host or the external device and an endpoint,
wherein the host is to at least enable, via the interface, the external device a) to access the endpoint registry to register an endpoint adapter configuration with the endpoint registry using data provided by the external device, b) to retrieve the endpoint adapter configuration from the endpoint registry, and c) to provide a registration result to the external device.

9. The computer-readable storage medium of claim 8, wherein the endpoint adapter, when launched by the external device, is to run as a separate process in a separate virtual machine or container from the host.

10. The computer-readable storage medium of claim 9, wherein the host is to deactivate the separate virtual machine or container running the endpoint adapter when the separate virtual machine or container is compromised.

11. The computer-readable storage medium of claim 8, wherein the endpoint registry is to include a first endpoint adapter for an internal endpoint and a second endpoint adapter for an external endpoint.

12. The computer-readable storage medium of claim 11, wherein the host is to treat the external endpoint the same as the internal endpoint once the second endpoint adapter is registered with the endpoint registry.

13. The computer-readable storage medium of claim 8, wherein the host is to trigger a registration service to initiate registration of the endpoint and the endpoint registry.

14. The computer-readable storage medium of claim 8, wherein the host is to serve as a reverse proxy between the external device and the endpoint adapter via the interface.

15. A method comprising:
connecting, by executing an instruction using at least one processor, a user device to a host of a cloud management platform;
providing, by executing an instruction using the at least one processor, endpoint adapter metadata from an endpoint registry to enable selection of an endpoint adapter;
accepting, by executing an instruction using the at least one processor, a selection of the endpoint adapter;
registering, by executing an instruction using the at least one processor, an endpoint adapter configuration for the selected endpoint adapter using data provided by the user device; and
providing, by executing an instruction using the at least one processor, a registration result to the user device.

16. The method of claim 15, further including launching the endpoint adapter as a separate process in a separate virtual machine or container from the host.

17. The method of claim 16, further including deactivating the separate virtual machine or container running the endpoint adapter when the separate virtual machine or container is compromised.

18. The method of claim 15, further including triggering, via the host, a registration service to initiate registration of the endpoint and the endpoint registry.

19. The method of claim 15, wherein the endpoint registry is to include a first endpoint adapter for an internal endpoint and a second endpoint adapter for an external endpoint.

20. The method of claim 19, wherein the host is to treat the external endpoint the same as the internal endpoint once the second endpoint adapter is registered with the endpoint registry.

* * * * *